(12) United States Patent
Dong et al.

(10) Patent No.: US 11,023,265 B2
(45) Date of Patent: Jun. 1, 2021

(54) TECHNIQUES FOR IMPROVING OUTPUT-PACKET-SIMILARITY BETWEEN PRIMARY AND SECONDARY VIRTUAL MACHINES

(71) Applicant: INTEL CORPORATION, Santa Clara, CA (US)

(72) Inventors: Yao Zu Dong, Shanghai (CN); Yunhong Jiang, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 39 days.

(21) Appl. No.: 15/552,738

(22) PCT Filed: Mar. 20, 2015

(86) PCT No.: PCT/CN2015/074739
§ 371 (c)(1),
(2) Date: Aug. 22, 2017

(87) PCT Pub. No.: WO2016/149870
PCT Pub. Date: Sep. 29, 2016

(65) Prior Publication Data
US 2018/0046480 A1    Feb. 15, 2018

(51) Int. Cl.
*G06F 9/455*     (2018.01)
*H04L 29/14*    (2006.01)
*G06F 11/14*    (2006.01)
*G06F 11/16*    (2006.01)
*H04L 29/12*    (2006.01)

(52) U.S. Cl.
CPC ...... *G06F 9/45537* (2013.01); *G06F 11/1484* (2013.01); *G06F 11/1633* (2013.01); *G06F 11/1654* (2013.01); *G06F 11/1683* (2013.01); *G06F 11/1687* (2013.01); *H04L 69/40* (2013.01); *G06F 2009/45595* (2013.01); *H04L 61/2007* (2013.01); *H04L 61/6063* (2013.01)

(58) Field of Classification Search
None
See application file for complete search history.

(56) References Cited

U.S. PATENT DOCUMENTS

| | | | |
|---|---|---|---|
| 6,857,009 B1* | 2/2005 | Ferreria | H04L 69/163 370/401 |
| 8,837,729 B2* | 9/2014 | Nikander | H04L 63/164 380/259 |
| 2009/0300414 A1 | 12/2009 | Huang et al. | |

(Continued)

OTHER PUBLICATIONS

COLO: Coarse-grained Lock-stepping Virtual Machines for Non-stop Service—Dong et al. (Year: 2013).*

(Continued)

*Primary Examiner* — Younes Naji
(74) *Attorney, Agent, or Firm* — Kacvinsky Daisak Bluni PLLC

(57) ABSTRACT

Examples may include intercepting packets outputted from a primary virtual machine (PVM) hosted by a first server and converting one or more fields of protocol headers for each intercepted packet such that output-packet-similarity may be increased between the PVM outputted packets and packets outputted by a secondary virtual machine (SVM) hosted by a second server.

22 Claims, 12 Drawing Sheets

System 100

(56) References Cited

U.S. PATENT DOCUMENTS

| | | | |
|---|---|---|---|
| 2013/0044636 A1* | 2/2013 | Koponen | H04L 41/0803 370/254 |
| 2014/0082043 A1 | 3/2014 | Heitz | |
| 2015/0074536 A1 | 3/2015 | Varadharajan et al. | |
| 2015/0081632 A1 | 3/2015 | Jacobs et al. | |
| 2017/0054738 A1* | 2/2017 | Avidan | H04L 63/1416 |

OTHER PUBLICATIONS

COLO: COarse-grained LOck-stepping Virtual Machines for Non Stop Service by Dong et al. (Year: 2013).*

Business Continuity as a Service ICT FP7-609828—"ORBIT: State-of-the-art and initial reference architecture specification" —Sep. 2014. (Year: 2014).*

International Search Report dated Dec. 18, 2015 for International Patent Application No. PCT/CN2015/074739.

* cited by examiner

1000

INTERCEPT FIRST NETWORK PACKETS OUTPUTTED FROM A PVM HOSTED BY A FIRST SERVER, EACH NETWORK PACKET OF THE FIRST NETWORK PACKETS HAVING A TCP/IP HEADER
1002

CONVERT ONE OR MORE FIELDS OF EACH TCP/IP HEADER TO MORE PREDICTABLE OR DETERMINISTIC VALUES WHILE MAINTAINING TCP/IP SEMANTICS FOR EACH RESPECTIVELY CONVERTED FIELD IN EACH TCP/IP HEADER, THE ONE OR MORE FIELDS INCLUDING AT LEAST ONE OF A TCP SEQUENCE NUMBER FIELD, AN IP HEADER ID FIELD, A TIMESTAMP FIELD OR A TCP WINDOW SIZE FIELD
1004

FORWARD THE FIRST NETWORK PACKETS WITH THE CONVERTED ONE OR MORE FIELDS TO A COLO MANAGER, THE COLO MANAGER CAPABLE OF DETERMINING OUTPUT-PACKET-SIMILARITY OF THE FIRST NETWORK PACKETS COMPARED TO CORRESPONDING SECOND NETWORK PACKETS OUTPUTTED FROM AN SVM HOSTED BY A SECOND SERVER, EACH NETWORK PACKET OF THE CORRESPONDING SECOND NETWORK PACKETS HAVING SIMILARLY CONVERTED ONE OR MORE FIELDS OF EACH TCP/IP HEADER
1006

*FIG. 10*

Storage Medium *1100*

Computer Executable Instructions for 1000

FIG. 11

TECHNIQUES FOR IMPROVING OUTPUT-PACKET-SIMILARITY BETWEEN PRIMARY AND SECONDARY VIRTUAL MACHINES

CROSS-REFERENCE TO RELATED APPLICATION

This application is a national phase claiming the benefit of and priority to International Patent Application No. PCT/CN2015/074739, entitled "TECHNIQUES FOR IMPROVING OUTPUT-PACKET-SIMILARITY BETWEEN PRIMARY AND SECONDARY VIRTUAL MACHINES", filed Mar. 20, 2015, which is hereby incorporated by reference it its entirety.

TECHNICAL FIELD

Examples described herein are generally related to routing data generated by a multi-threaded program between a server and a client.

BACKGROUND

Network servers coupled with client computing devices are increasingly being arranged to support or host virtual machine(s) (VMs) that enable multiple operating systems and/or applications to be supported by a single computing platform. Also, when high availability is desired for servers hosting VMs, a primary VM (PVM) and a secondary VM (SVM) may each be hosted on separate servers or nodes (e.g., within a data center) and their states may be replicated. This replication of states may provide for an application-agnostic, software-implemented hardware fault tolerance solution for "non-stop-service". The fault tolerance solution may allow for the SVM to take over (failover) when the server hosting the PVM suffers a hardware failure.

Lock-stepping is a fault tolerance solution that may replicate VM states per instruction. For example, PVM and SVM execute in parallel for deterministic instructions, but lock-step for non-deterministic instructions. However, lock-stepping may suffer from very large overhead when dealing with multiprocessor (MP) implementations, where each memory access might be non-deterministic.

Checkpointing is another fault tolerance solution that replicates a PVM state to the SVM at periodic epochs. For checkpointing, in order to guarantee a successful failover, all output packets may need to be buffered until a successful checkpoint has been completed. Always buffering until a successful checkpoint in a VM environment may lead to extra network latency due to output packet buffering and extra overhead due to frequent checkpoints sometimes referred to as passive checkpointing or periodic checkpointing.

COarse-grain LOck-stepping (COLO) is yet another fault tolerance solution that has both PVM and SVM being fed with a same request/data (input) network packets from a client. Logic supporting COLO may be capable of monitoring output responses of the PVM and SVM and consider the SVM's state as a valid replica of the PVM's state, as long as network responses (e.g., content of outputted packets) generated by the SVM match that of the PVM. If a given network response does not match, transmission of the network response to the client is withheld until the PVM state has been synchronized (force a new checkpoint) to the SVM state. Hence, COLO may ensure that a fault tolerant system is highly available via failover to the SVM. This high availability may exist even though non-determinism may mean that the SVM's internal state is different to that of the PVM, the SVM is equally valid and remains consistent from the point of view of external observers to the fault tolerant system that implements COLO. Thus, COLO may have advantages over pure lock-stepping or checkpointing fault tolerance solutions, by both avoiding complexity of handling MP non-deterministic in lock-stepping and reducing the checkpointing frequency/overhead in passive checkpointing.

COLO fault tolerance solutions may take advantage of such protocols as those associated with the transport control protocol/internet protocol (TCP/IP) stack. The TCP/IP stack may be arranged to have a state per TCP connection and may be capable of recovering from packet loss and/or packet re-ordering. COLO may include use of a per-TCP connection response packet comparison. The per-TCP connection response packet comparison may consider an SVM state as a valid replica if response packets of each TCP connection outputted from the PVM match response packets of each TCP connection outputted from the SVM. This matching is regardless of possible packet ordering across TCP connections.

BRIEF DESCRIPTION OF THE DRAWINGS

FIG. 10 illustrates an example logic flow.
FIG. 11 illustrates an example of a storage medium.

DETAILED DESCRIPTION

As contemplated in the present disclosure, COLO may have advantages over pure lock-stepping or checkpointing fault tolerance solutions. COLO may greatly improve performance of a highly available fault tolerant system via use of servers that host a PVM and an SVM. However, performance of COLO depends on output-packet-similarity of each TCP connection. For example, the number of identical output packets per-TCP connection the PVM and SVM may generate or a duration the PVM and SVM may generate output packets having matching content for all TCP connections.

Also, a PVM may open or maintain numerous TCP connections according to various TCP/internet protocol (IP) stack implementations. Further, TCP/IP stack implementations may not be deterministic. As a result of not being deterministic, one or more fields in TCP/IP headers for outputted packets may be less predictable and thus output-packet-similarity with corresponding output packets from an SVM may be more difficult to maintain for desirable lengths of time. In some examples, modifications may be made to open source operating systems (OSes) (e.g., Linux-based OSes) to make TCP/IP stack implementations more deterministic. However, proprietary-based OSes (e.g., Microsoft Windows®) are typically non-modifiable as the source code is not available to modify. It is with respect to these challenges that the examples described herein are needed.

According to some examples, techniques for improving output-packet-similarity between PVMs and SVMs may include intercepting first network packets outputted from a PVM hosted by a first server. Each network packet of the first network packets may have a transport control protocol/internet protocol (TCP/IP) header. The techniques may also include converting one or more fields of each TCP/IP header to more predictable or deterministic values while maintaining TCP/IP semantics for each respectively converted field in each TCP/IP header. The one or more fields may include at least one of a TCP sequence number field, an IP header identification (ID) field, a timestamp field or a TCP window size field. In some examples, the techniques may further include forwarding the first network packets with the converted one or more fields to a COLO manager. The COLO manager may be capable of determining output-packet-similarity of the first network packets compared to corresponding second network packets outputted from an SVM hosted by a second server. Each network packet of the corresponding second network packets may have similarly converted one or more fields of each TCP/IP header.

Figure 1:
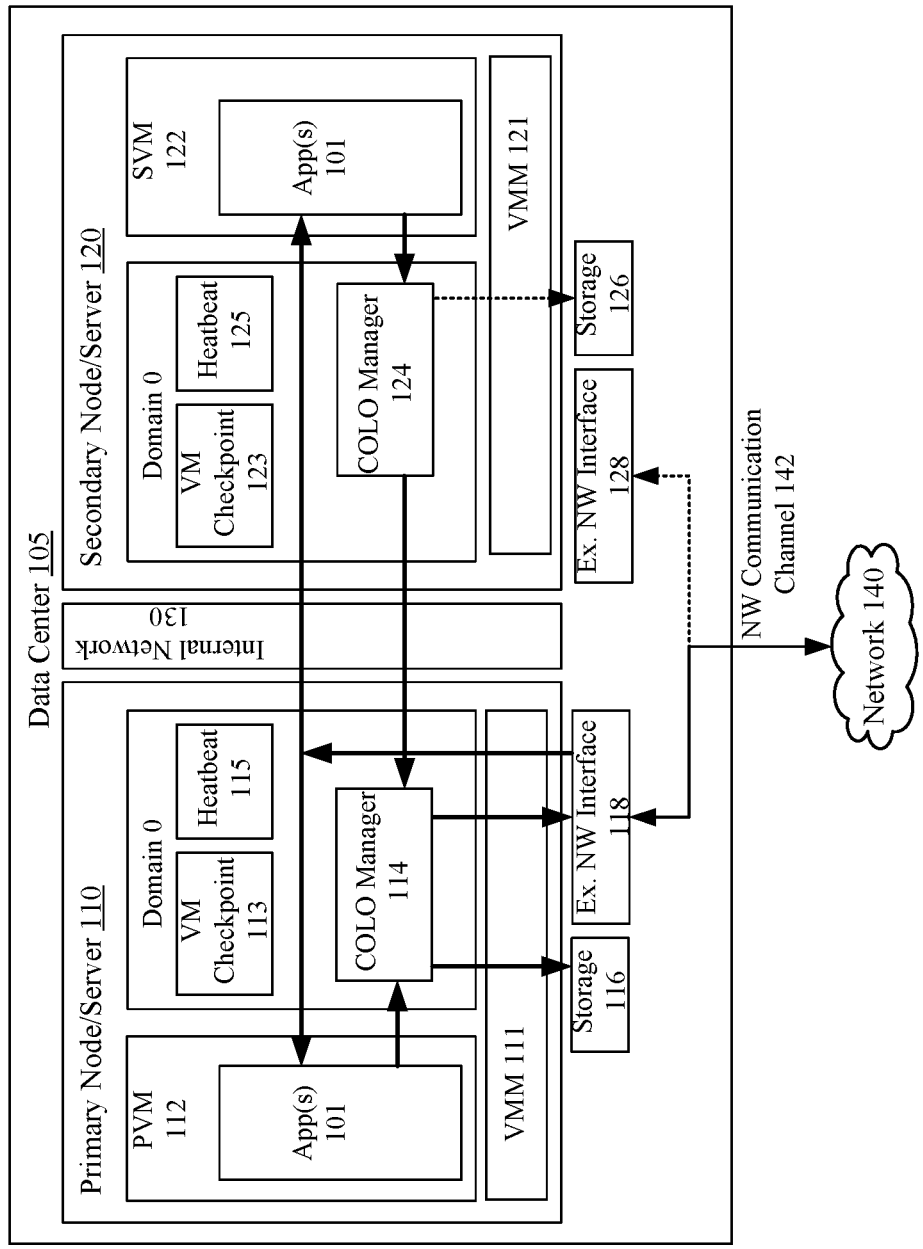
FIG. 1 illustrates an example first system.

FIG. 1 illustrates an example first system. In some examples, as shown in FIG. 1, the example first system includes system 100. System 100 includes a data center 105 having a primary node/server 110 coupled with a secondary node/server 120 via an internal network 130. Also, as shown in FIG. 1, primary node 110 or secondary node 120 may be coupled with an external network 140 via a network (NW) communication channel 142.

According to some examples, primary node 110 and secondary node 120 may be arranged as part of a fault tolerance system. For these examples, primary node 110 may be arranged to host a PVM 112 and secondary node 120 may be arranged to host an SVM 122. Both PVM 112 and SVM 122 may be capable of separately executing the same application(s) 101. In some examples, PVM 112/SVM 122 running application(s) 101 may each utilize one or more TCP connections to route outputted packets having TCP/IP headers to an external network such as network 140. As described more below, at least some TCP/IP header fields may be converted from less deterministic/fine-grained values to more deterministic/coarse-grained values while maintaining TCP/IP semantics in order to improve output-packet-similarity between PVM 112 and SVM 122 while separately executing the same application(s) 101.

According to some examples, primary node/server 110 and secondary node/server 120 may each maintain respective heartbeats 115 and 125 to communicate health status for the overall server (e.g., physical hardware). For example, heartbeat 115 may relay health status information for primary node/server 110 to enable secondary node 120 to determine if primary node/server 110 has failed or become unresponsive and thus requiring SVM 122 to failover and become the PVM to serve or handle requests from clients coupled to network 140 (not shown). Similarly, heartbeat 125 may relay health status information for secondary node/server 120 to enable primary node/server 110 to determine if secondary node/server 120 has failed or become unresponsive and thus requiring another SVM to be configured for providing fault tolerance for PVM 112.

According to some examples, PVM 112 and SVM 122 may operate within the same network domain 0 for processing requests received from clients coupled to network 140. For these examples, requests may be received over NW communication channel 142 through external NW interface 118 at primary node 110. The requests may than be routed simultaneously to application(s) 101 being executed at both PVM 112 and SVM 122. A COLO manager 114 at primary node 110 and a COLO manager 124 may monitor outputs/responses generated by application(s) 101. COLO managers 114 and 124 may withhold outputs/responses and at least temporarily store withheld outputs/responses in respective storages 116 and 126 if the outputs/responses do not match. COLO managers 114 and 124 may then force a new checkpoint (e.g., VM checkpoints 113 and 123) to cause SVM 122 to become synchronized with PVM 112 or placed in the same machine state.

In some examples, techniques may be executed that may decrease possible output disparities or increase output-packet-similarity between application(s) 101 separately executed at PVM 112 and SVM 122. As mentioned above and described more below, these techniques may include logic and/or features (not shown in FIG. 1) capable of converting at least some TCP/IP header fields from less deterministic/fine-grained values to more deterministic/coarse-grained values while maintaining TCP/IP semantics in order to improve output-packet-similarity between PVM 112 and SVM 122.

FIG. 1 depicts a type of hybrid virtual machine manager (VMM) model where a privilege guest operating system, such as domain 0 having a VMM 111 at primary node/server 110 and a VMM 121 at secondary node/server 120, may be used to run a native device driver and manage other guests. In other examples, types of VMM models such as hypervisor model or a host-based model may be implemented at a data center similar to data center 105. For these other examples, the hypervisor model or the host-based model may be type-II VMM models. Meanwhile the hybrid VMM model shown in FIG. 1 may be a type-I VMM model. Examples are not limited exclusively to a type-I or a type-II VMM model. Examples for converting TCP/IP headers to improve output-packet-similarity between a PVM and SVM may apply equally to both types of VMM models.

Figure 2:
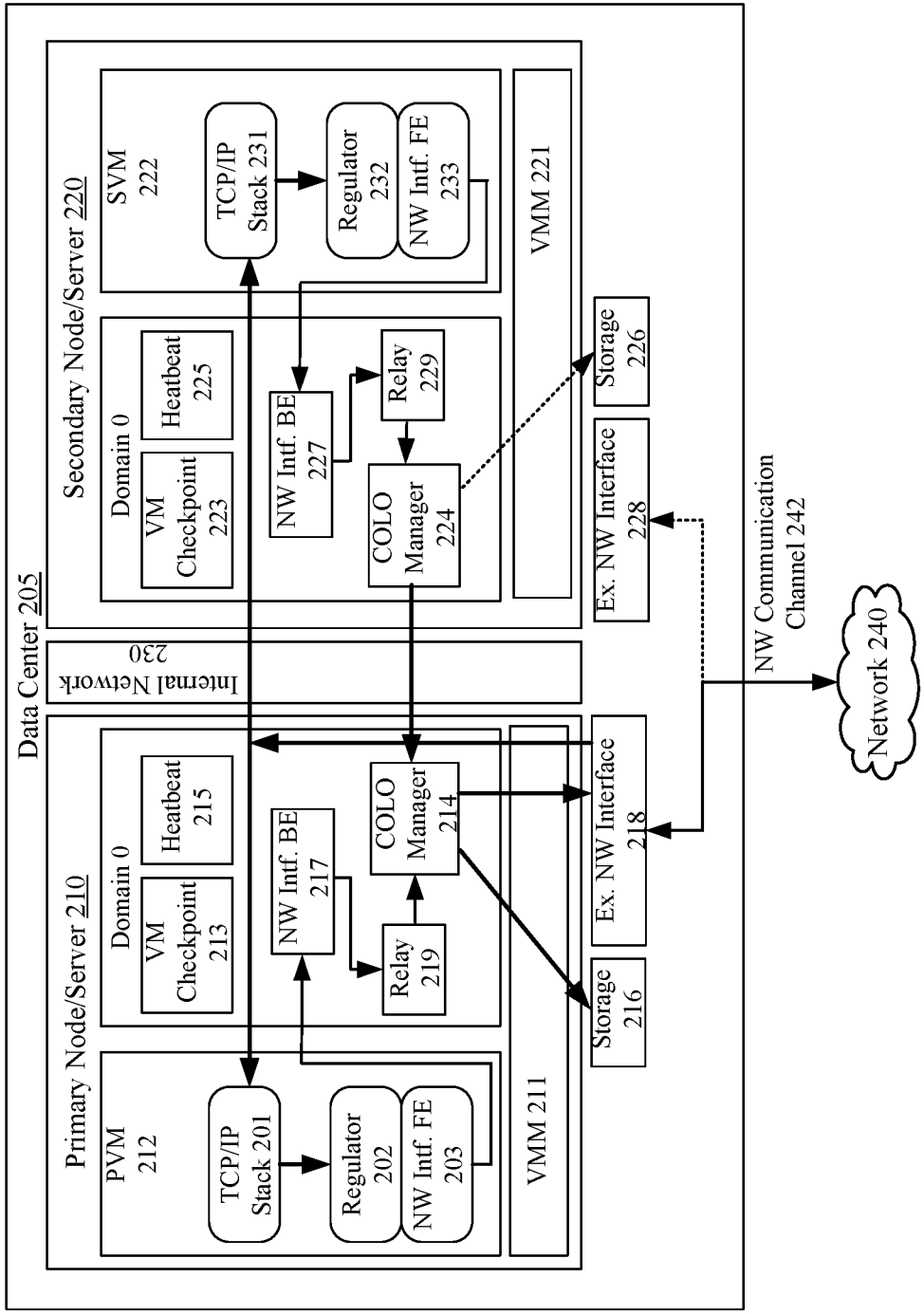
FIG. 2 illustrates an example second system.

FIG. 2 illustrates an example second system. In some examples, as shown in FIG. 2, the example second system includes system 200. System 200 includes similar elements as mentioned previously for system 100 in FIG. 1. However system 200 includes additional details of logic and/or features associated with outputted packets generated by applications (not shown) separately executed by PVM 212 and SVM 222. These additional elements, as shown in FIG. 2 may include a TCP/IP stack 201, a regulator 202 and a network interface front end (NW Intf. FE) 203 at PVM 212 with a corresponding TCP/IP stack 231, regulator 232 and NW Intf. FE 233 at SVM 222. The additional elements may also include a NW interface back end (NW Intf. BE) 217 and a relay 219 for domain 0 at primary node/server 210 and a NW Intf. BE 227 and relay 229 for domain 0 at secondary node/server 220.

According to some examples, PVM 212 may implement a non-modifiable or proprietary OS. For these examples, as shown in FIG. 2, regulator 202 may be inserted between TCP/IP stack 201 that may be executed by the non-modifiable OS and NW Intf. BE 203. For these examples, regulator 202 may include logic and/or features to intercept first network packets outputted from TCP/IP stack 201. The first network packets may each have a TCP/IP header that may include fields arranged in compliance with a TCP/IP protocol as described in one or more industry standards including TCP/IP protocols described in Internet Engineering Task Force (IETF) Request For Comments (RFC) 791 and 793, published September 1981 and/or later revisions or versions of these RFCs. Regulator 202 may also include logic and/or features to convert one or more fields of each TCP/IP header to more predictable or deterministic values while maintaining TCP/IP semantics (e.g., as described in RFC 791 and 793) for each respectively converted field in each TCP/IP header. The more predictable or deterministic values may then result in greater output-packet-similarity between PVM 212 and SVM 222. The converted one or more fields may include, but are not limited to, a TCP sequence number field, an IP header ID field, a timestamp field or a TCP window size field. These fields and the process of conversion to more predictable or deterministic values for each of these fields are described more below.

This disclosure is not limited to network packets having just TCP/IP headers. Other protocol headers are contemplated. The other protocols may include, but are not limited to, reliable data protocol (RDP) as described in RFC 1151, entitled "Version 2 of the Reliable Data Protocol (RDP)", published April 1990 and/or later revisions or versions, or multipath TCP (MPTC) as described in RFC 6824, entitled "TCP Extensions for Multipath Operation with Multiple Addresses", published January 2012 and/or later revision or versions, or stream control transmission protocol (SCTP) as described in RFC 4960, entitled "Stream Control Transmission Protocol", published September 2007 and/or later revisions or versions. Fields similar to those included in TCP/IP headers may be converted to more predictable or deterministic values in a similar manner as mentioned above and described in more detail below while maintaining protocol semantics.

According to some examples, logic and/or features for regulator 202 may then forward the first network packets with the converted one or more fields towards COLO manager 214. For these examples, the first network packets may be forwarded first through NW Intf. FE 203 to NW Intf. BE 217 and then to relay 219 as shown in FIG. 2. Relay 219 may include logic and/or features to further improve output-packet-similarity between PVM 212 and SVM 222. For example, the logic and/or features for relay 219 may be capable of reordering the first network packets (e.g., based on a converted field of respective TCP/IP headers) to further improve output-packet-similarity between PVM 212 and SVM 222 as observed by COLO manager 214. Relay 219 may behave in a similar manner to a middlebox in an internet network scenario that follows the rule of internet middlebox that includes not impacting behaviors of server and client. In this example, for purposes of the example rule of internet middlebox, the server may be PVM 212 and the client may be COLO manager 214.

In some examples, COLO manager 214 may be capable of determining output-packet-similarity of the first network packets having the converted one or more TCP/IP fields compared to corresponding second network packets outputted from SVM 220. For these examples, the corresponding second network packets may have similarly converted one or more fields of each TCP/IP header. The converted one of more fields may have been converted by logic and/or features for regulator 232 similarly positioned between TCP/IP stack 231 and NW Intf. FE 233 at SVM 222 and then forwarded through NW Intf. BE 227 and relay 229 before being observed by COLO manager 224 as shown in FIG. 2.

According to some examples, COLO managers 214 and 224 may include logic and/or features capable of determining output-packet-similarity based on a first time interval during which content matched between the one or more first network packets outputted from PVM 212 and the one or more second network packets outputted from SVM 222. For these examples, the similarly converted one or more fields of each TCP/IP header for both the first network packets and the second network packets may result in an increased likelihood that the first time interval is greater than a second time interval during which content matched between non-converted one or more fields of each TCP/IP header for both the first network packets and the second network packets respectfully outputted from PVM 212 and SVM 222. In other words, for these examples, converting the one or more fields of TCP/IP headers for outputted packets improves or increases output-packet-similarity between 212 and SVM 22 compared to not converting the one or more fields.

In some examples, logic and/or features for regulator 202 and 232 may be separate programs implemented by respective OSes executed by PVM 212 and SVM 222. In other examples, the logic and/or features may be combined with TCP/IP 201. In either case, the logic and/or features for regulator 202 and 232 may be capable of intercepting network packets outputted from PVM 212 and SVM 222 to convert one or more fields of TCP/IP headers as mentioned above and described more below.

Figure 3:
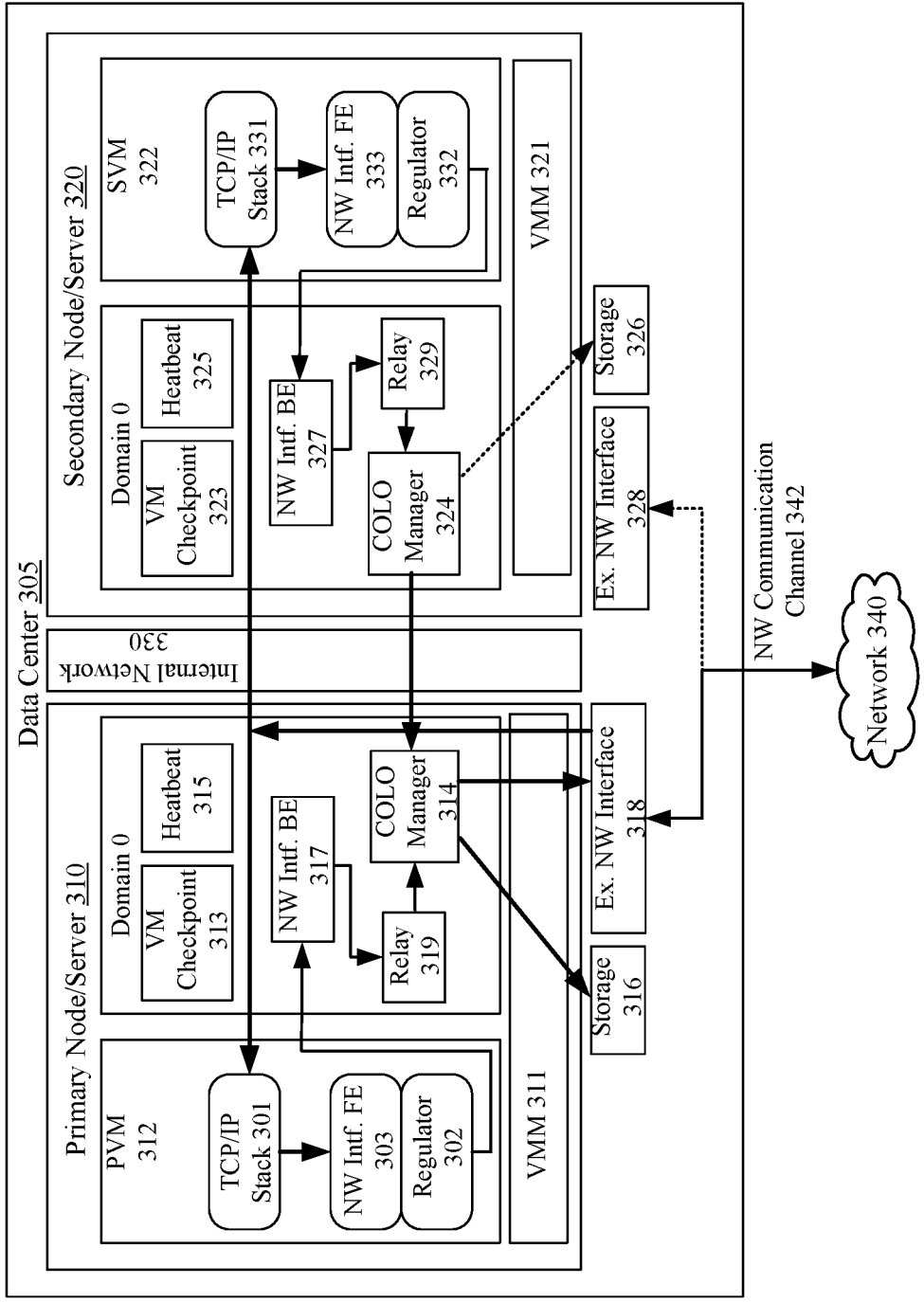
FIG. 3 illustrates an example third system.

FIG. 3 illustrates an example third system. In some examples, as shown in FIG. 3, the example third system includes system 300. System 300 includes similar elements as mentioned previously for systems 100 and 200 in FIGS. 1 and 2. More particularly, system 300 has all the elements of system 200 from FIG. 2. The difference between elements of systems 200 and 300 is the location of regulators 302 and 332.

According to some examples, network packets outputted by PVM 312 and SVM 322 may be intercepted in a similar manner as mentioned above for system 200 to convert one or more fields of TCP/IP headers. However, in some examples, logic and/or features for regulators 302 and 332 may be included as modules operating with logic or features of NW Intf. FEs 303 and 333, respectively. For example, as part of a NW interface driver. In other examples, logic and/or features for regulators 302 and 332 may be separate programs implemented a part from NW Intf. FEs 303 and 333, respectively.

Figure 4:
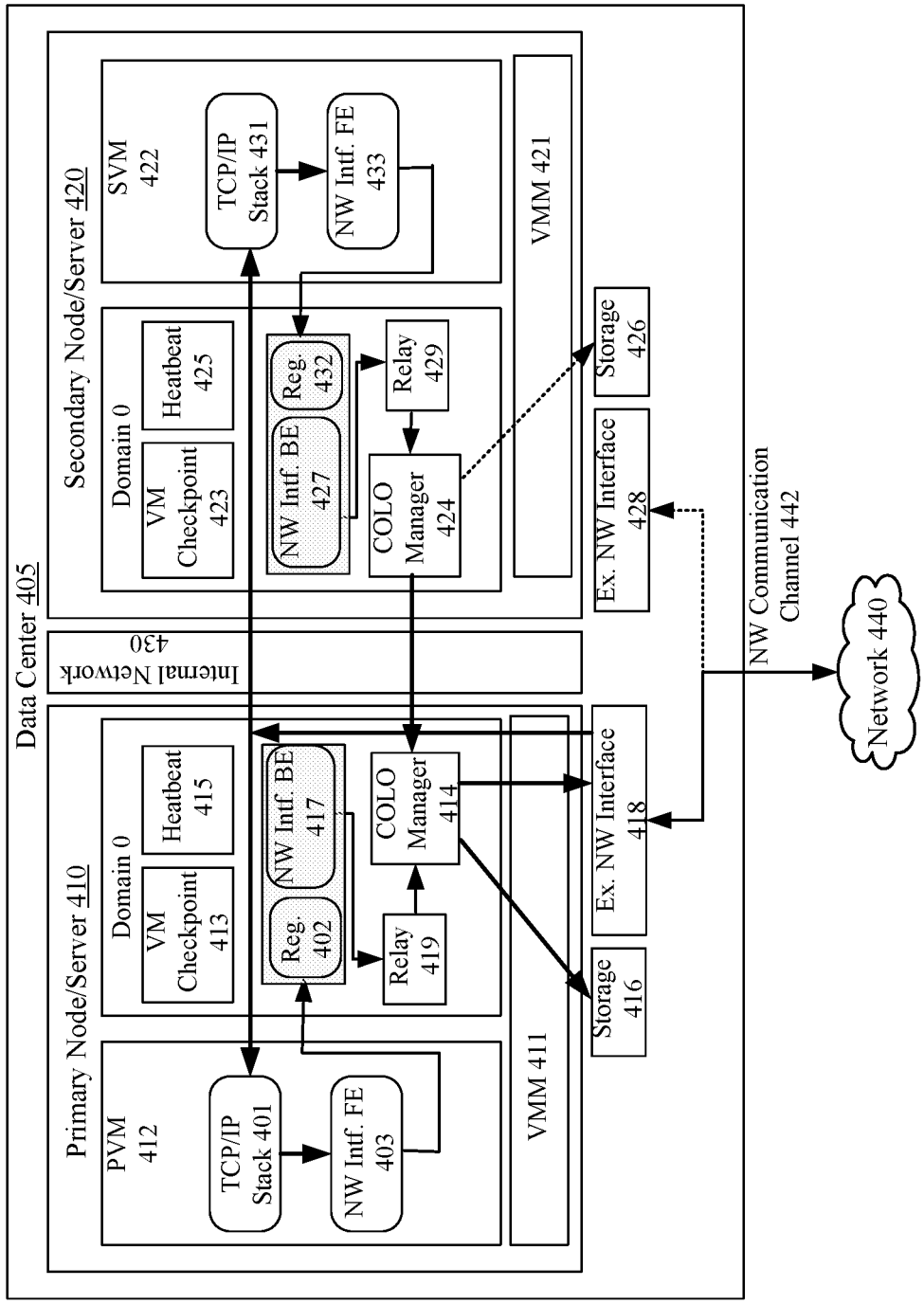
FIG. 4 illustrates an example fourth system.

FIG. 4 illustrates an example fourth system. In some examples, as shown in FIG. 4, the example fourth system includes system 400. System 400 includes similar elements as mentioned previously for systems 100, 200 and 300 in FIGS. 1-3. More particularly, system 400 has all the elements of systems 200 and 300 from FIGS. 2 and 3. The difference between elements of systems 200/300 and 400 is the location of regulators 402 and 432.

According to some examples, network packets outputted by PVM 412 and SVM 422 may be intercepted in a similar manner as mentioned above for system 200 to convert one or more fields of TCP/IP headers. However, in some examples, logic and/or features for regulators 402 and 432 may be included as modules operating with logic or features of NW Intf. BEs 417 and 432. For example, as part of a NW interface driver for domain 0. In other examples, logic and/or features for regulators 402 and 432 may be modules virtually implemented by logic and/or features of COLO managers 414 and 424, respectively.

Figure 5:
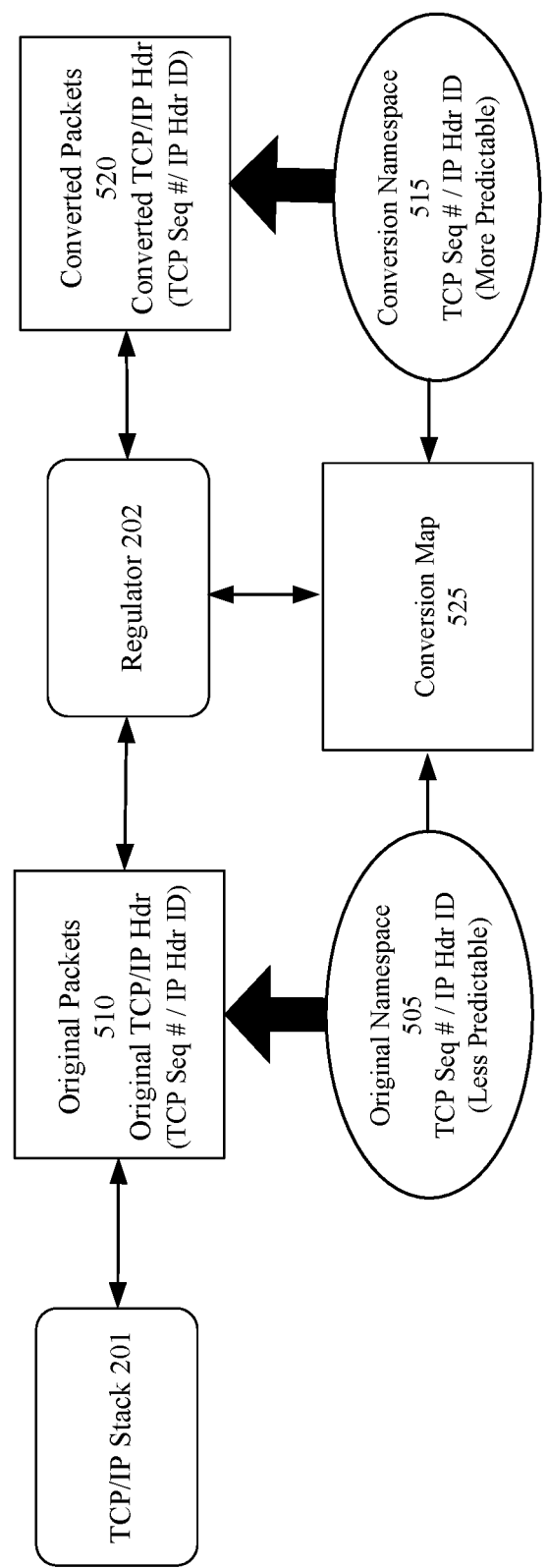
FIG. 5 illustrates an example first conversion process.

FIG. 5 illustrates an example first conversion process. As shown in FIG. 5, the first conversion process includes conversion process 500. In some examples, conversion process 500 may be implemented by elements of system 200 shown and described for FIG. 2. For example, TCP/IP stack 201 and regulator 202. Although examples are not limited to elements of system 200, similar elements of systems 300 and 400 may also implement conversion process 500.

According to some examples, TCP/IP stack 201 may output original network packets having original TCP/IP headers for each outputted original network packet 510. For these examples, an original namespace 505 may include TCP sequence numbers or IP header IDs that were generated using a first randomization value. For these examples, original namespace 505 may be generated by a non-modifiable OS executed by PVM 212. Hence, unavailable seed values for randomly generating TCP sequence numbers or IP header IDs included in original namespace 505 may make it difficult to predict TCP sequence numbers or IP header IDs as they are added to TCP/IP headers by TCP/IP stack 201 and then outputted. Predictability may be important to match those TCP sequence numbers or IP header IDs with corresponding TCP sequence numbers or IP header IDs for network packets outputted from SVM 222. The more matched, the greater the likelihood of longer periods of output-packet-similarity as observed by COLO manager 214.

In some examples, in order to improve predictability of TCP sequence numbers or IP header IDs as they are added to TCP/IP headers by TCP/IP stack 201 and then outputted, logic and/or features for regulator 202 may generate and/or access a conversion namespace 515 that includes conversion TCP sequence numbers or IP header IDs randomly generated using a second randomization value. The logic and/or features for regulator 202 may then map each original TCP sequence number or IP header ID included in original namespace 505 to each conversion TCP sequence number or IP header ID included in conversion namespace 515 to generate conversion map 525.

According to some examples, the logic and/or features for regulator 202 may identify each original TCP sequence number or IP header ID included in respective TCP sequence number or IP header ID fields for each intercepted original packet 510 outputted by TCP/IP stack 201. For these examples, each identified original TCP sequence number or IP header ID from original namespace 505 may then be converted to a conversion TCP sequence number or IP header ID from conversion namespace 515 using conversion map 525. The conversion TCP sequence number or IP header ID may then be inserted in TCP sequence number field or IP header ID field for each intercepted original packet 510 resulting in converted packets 520. The first and second randomization values may be equivalent randomization values or they may be different randomization values.

In some examples, although not shown in FIG. 5, relay 219 may include logic and/or features capable of reordering converted packets 520 packets based on conversion TCP sequence numbers or IP header IDs included in each converted TCP sequence number field of respective TCP/IP headers for converted packets 520. For these examples, converted packets 520 may be reordered such that the conversion TCP sequence number or IP header IDs are in a sequential order. The reordering of converted packets 520 may further improve output-packet-similarity between packets outputted by PVM 212 and SVM 222.

In some example, the second randomization value used to generate the conversion namespace 515 may be coordinated with VMM 211. VMM 211 may further coordinate with VMM 221 at secondary node/server 220 so that the second randomization value can be relayed to regulator 232. For these examples, a synchronized conversion namespace may be generated by and/or accessible to logic and/or features for regulator 232 that includes conversion TCP sequence numbers or IP header IDs randomly generated using the second randomization value. Each sequence number or IP header ID from this synchronized namespace may be capable of being mapped to an original TCP sequence number or IP header ID from an original namespace randomly generated by an OS executed by SVM 222 using the same randomization values as used by the OS executed by PVM 212 to generate original names space 205 as mentioned above. These mapped conversion TCP sequence numbers or IP header ID may generate a similar conversion map to the one generated by regulator 202 as mentioned above. This similar conversion map may then be used by logic and/or features for regulator 232 to convert TCP sequence number fields of each network packet outputted by SVM 222 in a similar manner as mentioned above for regulator 202.

Figure 6:
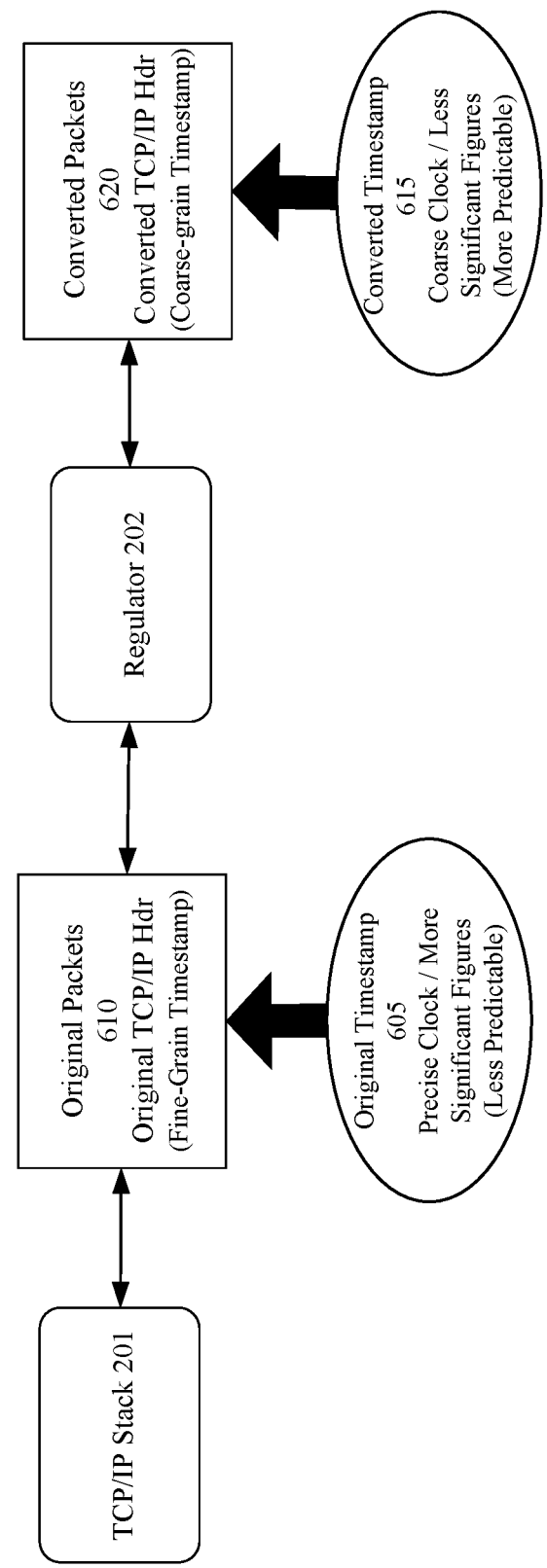
FIG. 6 illustrates an example second conversion process.

FIG. 6 illustrates an example second conversion process. As shown in FIG. 6, the second conversion process includes conversion process 600. In some examples, similar to conversion process 500, conversion process 600 may be implemented by elements of system 200 shown and described for FIG. 2. For these examples, TCP/IP stack 601 may be capable of turning on a fine-grain timestamp for each original packet of original packets 610 outputted from PVM 212. The fine-grain timestamp may be implemented using different fine granularities per an OS executed by PVM 212 using, for example, a central processing unit (CPU) timestamp counter (TCS). The fine-grain timestamp may result in original timestamp 605. Original timestamp 605 may be precise or captured with more significant figures that may make original timestamp 605 relatively precise. However the preciseness may make these timestamp values less predictable or deterministic when comparing network packets outputted between PVM 212 and SVM 222.

According to some examples, logic and/or features for regulator 202 may convert original timestamp values included in timestamp fields of TCP/IP headers of intercepted original packets 610 with respective conversion timestamp values from converted timestamp 615 to result in converted packets 620. For these examples, converted timestamp 615 may be coarse-grain timestamp from other types of less fine-grain or less precise clocks (e.g., compared to a CPU TCS) such system jiffies or system-level clocks. Converted timestamp 615 may have fewer significant figures compared to original timestamp 605. The coarse-grain timestamp from converted timestamp 615 now included with converted packets 620 may be more deterministic or predictable when comparing network packets outputted between PVM 212 and SVM 222.

Figure 7:
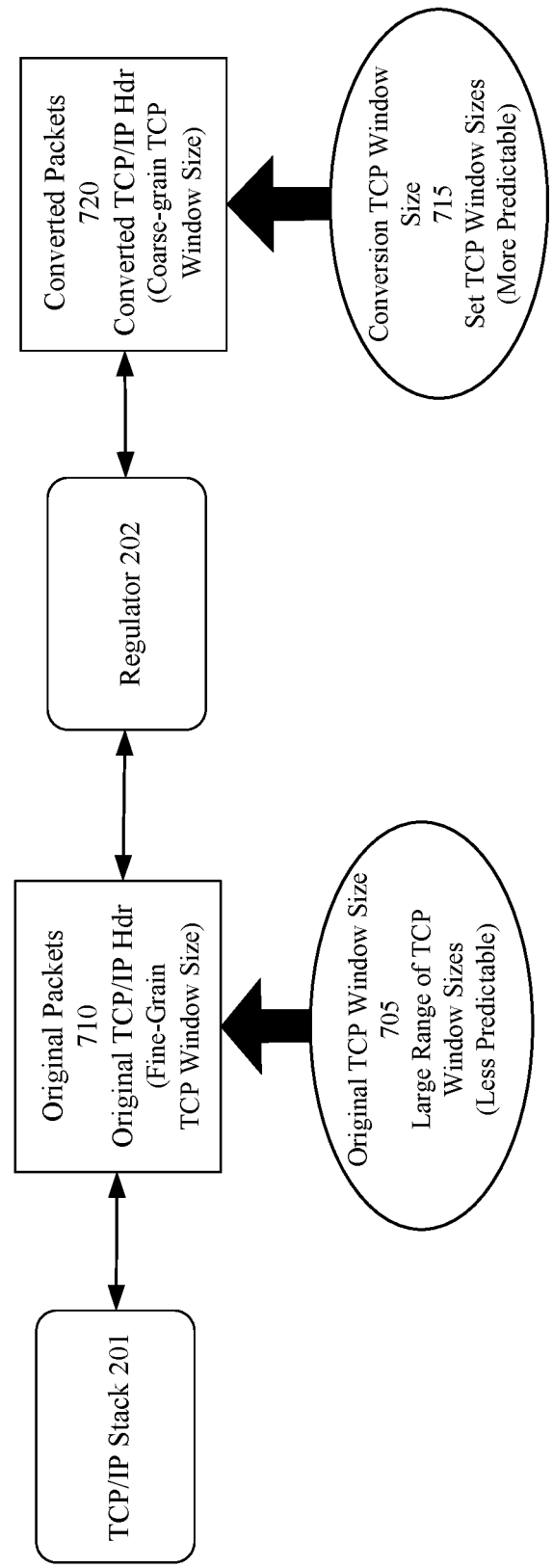
FIG. 7 illustrates an example third conversion process.

FIG. 7 illustrates an example third conversion process. As shown in FIG. 7, the third conversion process includes conversion process 700. In some examples, similar to conversion process 500, conversion process 700 may be implemented by elements of system 200 shown and described for FIG. 2. For these examples, TCP/IP stack 201 may use a large range of TCP window sizes from original window size 705 to indicate a size of its internal buffer so that a receiver of original packets 710 can flow control response packets based on the indicated TCP window size. A divergence of a machine state between PVM 212 and SVM 222, for example, may lead to different rates of using or consuming respective TCP/IP buffers and this may lead to different TCP window sizes over a possibly large range of TCP window sizes included original TCP window size 705.

In some examples, conversion TCP window size 715 may include set TCP window sizes. The set TCP window sizes of TCP window size 715 may correspond to rounded (either up or down) original TCP window sizes from the large range of TCP window sizes in original TCP window size 705. For example, original packets 710 may have include an original TCP window size of 355 in a TCP window field of each TCP/IP header. Logic and/or features for regulator 202 may convert this original TCP window size of 355 by increasing or decreasing to a nearest set TCP window size from among set TCP window sizes at conversion TCP window size 715. The nearest set TCP window size, for example, may be 400. As of result of increasing to the nearest set TCP window size, converted packets 720 may now have a more predictable or deterministic TCP window size that may allow for at least some divergence of machine state between PVM 212 and SVM 222 that may lead to different TCP window sizes.

Figure 8:
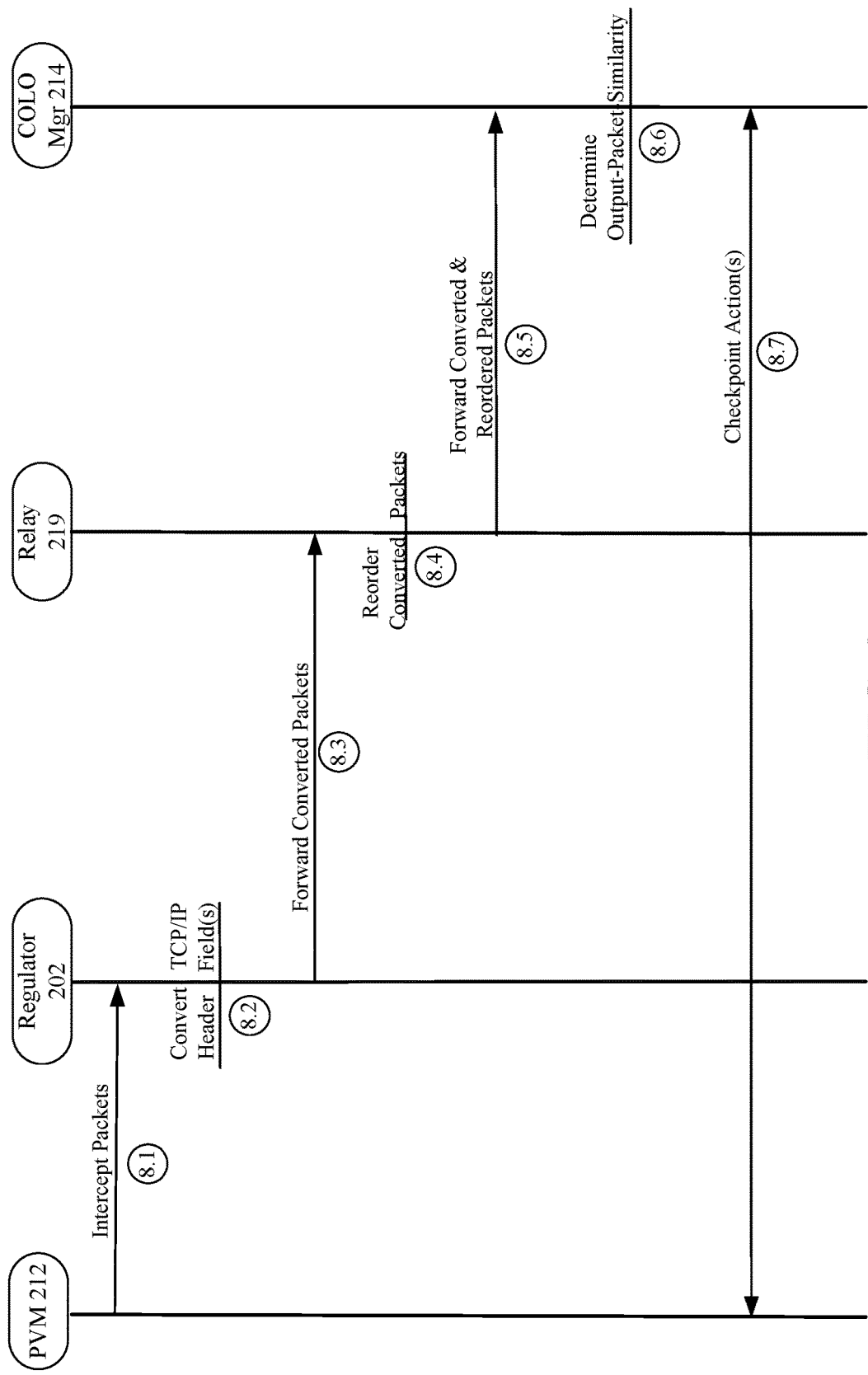
FIG. 8 illustrates an example process.

FIG. 8 illustrates an example process 800. In some examples, process 800 may be for improving output-packet-similarity between PVMs and SVMs. For these examples, elements of system 200 as shown in FIG. 2 such as PVM 212, regulator 202, relay 219 or COLO manager 214 may be related to process 800. Also, conversion processes 500, 600 or 700 may also be related to process 800. However, the example process 800 is not limited to implementations using elements of system 200 or conversion processes 500, 600 or 700 shown in FIGS. 2, 5, 6, and 7.

Beginning at process 8.1 (Intercept Packets), logic and/or features for regulator 202 may intercept packets outputted by PVM 212. In some examples, the intercepted packets may each included TCP/IP headers having fields that include original fine-grain-like timestamps or TCP window sizes or may have original TCP sequence numbers or IP header IDs that may be non-deterministic or difficult to predict by COLO managers such as COLO manager 214 or COLO manager 224.

Moving to process 8.2 (Convert TCP/IP Header Field(s)), logic and/or features for regulator 202 may convert one or more fields of each original TCP/IP header to more predictable or deterministic values while maintaining TCP/IP semantics (e.g., according to RFC 791 or 793) for each respectively converted field in each original TCP/IP header. In some examples, the one or more fields may be converted in a similar manner as described in conversion processes 500, 600 or 700 for FIGS. 5-7.

Moving to process 8.3 (Forward Converted Packets), logic and/or features for regulator 202 may then forward converted packets that each have one or more converted fields in their TCP/IP headers to relay 219.

Moving to process 8.4 (Reorder Converted Packets), logic and/or features for relay 219 may be capable of reordering the converted packets forwarded from regulator 202. In some examples, the converted fields of each converted packet's TCP/IP header may include a converted TCP sequence number or IP header ID. Relay 219 may reorder the converted packets such that the converted TCP sequence number or IP header ID enable the converted packets to be in a sequential order.

Moving to process 8.5 (Forward Converted & Reordered Packets), logic and/or features for relay 219 may be capable of forwarding converted and reordered packets to COLO manager 214.

Moving to process 8.6 (Determine Output-Packet-Similarity), logic and/or features for COLO manager 214 may be capable of determining output-packet-similarity of the converted packets outputted from PVM 212 compared to corresponding packets outputted from SVM 222. In some examples, each of the corresponding packets outputted from SVM 222 may have similarly converted one or more fields of each TCP/IP header as mentioned above for process 8.3. Also, the corresponding packets may be reordered in a similar manner as mentioned above for process 8.4. For these examples, the determined output-packet-similarity may be based on a first time interval during which content matched between one or more of the converted packets from PVM 212 with similarly converted packets from SVM 222. The similarly converted packets may have one or more TCP/IP header fields converted such that there may be an increased likelihood that the first time interval is greater than a second time interval during which content matched between non-converted packets outputted from PVM 212 and SVM 222.

Moving to process 8.7 (Checkpoint Action(s)), logic and/or features for COLO manager 214 may cause a checkpoint action responsive to a determined output-packet-similarity that falls below a predetermined threshold. In some examples, the checkpoint action may include coordinating with PVM 212 to obtain machine state information to synchronize or lock-step its machine state with that of SVM 222. In one example, the predetermined threshold may be 40 milliseconds (ms). So for this one example, if the output-packet-similarity has a time interval that falls below 40 ms a checkpoint action may be caused by COLO manager 214. In other examples, logic and/or features for COLO 214 may cause a checkpoint action responsive to the output-packet-similarity being just different and not involving a predetermined time-based threshold. The process then may come to an end or may start over at process 8.1.

Figure 9:
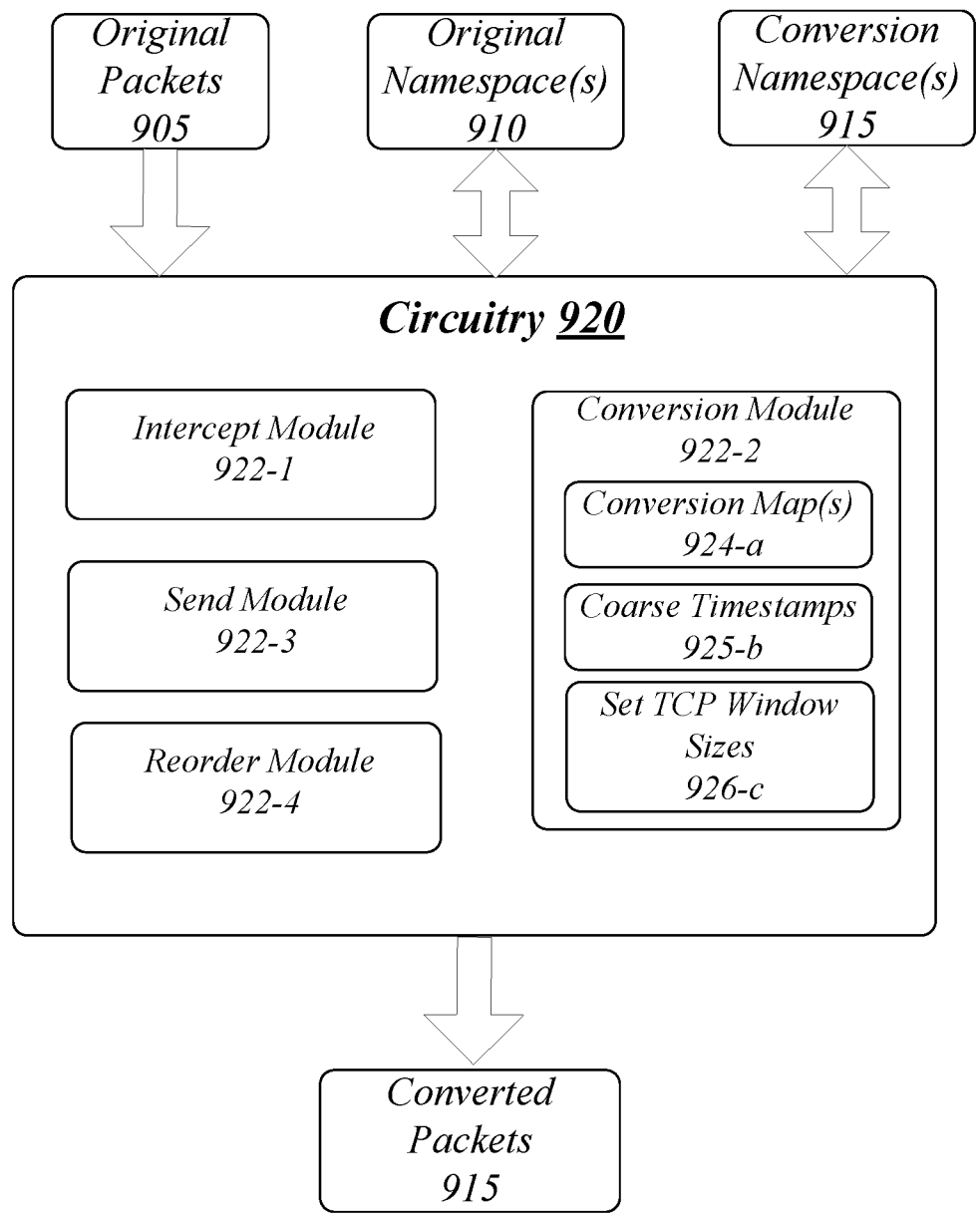
FIG. 9 illustrates an example block diagram for an apparatus.

FIG. 9 illustrates an example block diagram for an apparatus 900. As shown in FIG. 9, the first apparatus includes an apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may be supported by circuitry 920 maintained at a node or server computing device. Circuitry 920 may be arranged to execute one or more software or firmware implemented modules or components 922-*a*. It is worthy to note that "a" and "b" and "c" and similar designators as used herein are intended to be variables representing any positive integer. Thus, for example, if an implementation sets a value for a=4, then a complete set of software or firmware for components 922-*a* may include modules 922-1, 922-2, 922-3 or 922-4. The examples presented are not limited in this context and the different variables used throughout may represent the same or different integer values. Also, these "modules" may be software/firmware stored in computer-readable media, and although the modules are shown in FIG. 9 as discrete boxes, this does not limit these modules to storage in distinct computer-readable media components (e.g., a separate memory, etc.).

According to some examples, circuitry 920 may include a processor or processor circuitry. Circuitry 920 may be part of circuitry at a node or server (e.g., primary node/server 210, secondary node/server 220) that may include processing cores or elements. The circuitry including one or more processing cores can be any of various commercially available processors, including without limitation an AMD® Athlon®, Duron® and Opteron® processors; ARM® application, embedded and secure processors; Qualcomm® Snapdragon, IBM®, Motorola® DragonBall®, Nvidia®Tegra® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as part of circuitry 920. According to some examples circuitry 920 may also include an application specific integrated circuit (ASIC) and at least some components 922-*a* may be implemented as hardware elements of the ASIC.

According to some examples, apparatus 900 may include an intercept module 922-1. Intercept module 922-1 may be executed by circuitry 920 to intercept first network packets outputted from a PVM hosted by a first server, each network packet of the first network packets having a TCP/IP header. For these examples, the intercepted first network packets may be included in original packets 905.

In some examples, apparatus 900 may also include a conversion module 922-2. Conversion module 922-2 may be executed by circuitry 920 to convert one or more fields of each TCP/IP header to more predictable or deterministic values while maintaining TCP/IP semantics for each respectively converted field in each TCP/IP header, the one or more fields including at least one of a TCP sequence number field, an IP header ID field, a timestamp field or a TCP window size field. Converted packets 915 may include packets having the one or more converted fields. For these examples, conversion module 922-2 may maintain or store conversion map(s) 924-*a* in a data structure (e.g., a lookup table (LUT)) to facilitate conversion of TCP sequence or IP header ID fields based on original namespace(s) 910 and conversion namespace(s) 915. Original namespace(s) 910 may include original TCP sequence numbers or IP header IDs for original network packets outputted by the PVM and conversion namespace(s) 915 may include conversion TCP sequence numbers or IP header IDs to be used for converting TCP sequence or IP header ID fields. Also for these examples, conversion module 922-2 may maintain or store coarse timestamps 925-*b* (e.g., in a LUT) that may include conversion timestamps for converting timestamp fields. Also for these examples, conversion module 922-2 may maintain or store set TCP window sizes 926-*c* (e.g., in a LUT) that may include conversion set TCP window sizes for converting TCP window size fields.

According to some examples, apparatus 900 may also include a send module 922-3. Send module 922-3 may be executed by circuitry 920 to forward the first network packets with converted one or more fields of each TCP/IP header to a COLO manager. For these examples, the COLO manager may be capable of determining output-packet-similarity of the first network packets compared to corresponding second network packets outputted from an SVM hosted by a second server, each network packet of the corresponding second network packets having similarly converted one or more fields of each TCP/IP header.

In some examples, apparatus 900 may also include a reorder module 922-4. According to some first examples, reorder module 922-4 may be executed by circuitry 920 to reorder the intercepted first network packets based on conversion TCP sequence numbers included in each converted TCP sequence number field of the respective TCP/IP headers for the intercepted one or more first network packets by conversion module 922-2, the intercepted first network packets reordered such that the first conversion TCP sequence numbers are in a sequential order. In some second examples, reorder module 922-4 may be executed by circuitry 920 to reorder the intercepted first network packets based on the first conversion IP header ID numbers included in each converted IP header ID number field of the respective TCP/IP headers for the intercepted one or more first network packets, the intercepted first network packets reordered such that the first conversion IP header ID numbers are in a sequential order.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example of a first logic flow. As shown in FIG. 10 the first logic flow includes a logic flow 1000. Logic flow 1000 may be representative of some or all of the operations executed by one or more logic, features, or devices described herein, such as apparatus 900. More particularly, logic flow 1000 may be implemented by at least intercept module 922-1, conversion module 922-2 or forward module 922-3.

According to some examples, logic flow 1000 at block 1002 may intercept first network packets outputted from a PVM hosted by a first server, each network packet of the first network packets having a TCP/IP header. For these examples, intercept module 922-1 may intercept the first network packets.

In some examples, logic flow 1000 at block 1004 may convert one or more fields of each TCP/IP header to more predictable or deterministic values while maintaining TCP/IP semantics for each respectively converted field in each TCP/IP header, the one or more fields including at least one of a TCP sequence number field, an IP header ID field, a timestamp field or a TCP window size field. For these examples, conversion module 922-2 may convert the one or more fields.

According to some examples, logic flow 1000 at block 1006 may forward the first network packets with the converted one or more fields to a COLO manager, the COLO manager capable of determining output-packet-similarity of the first network packets compared to corresponding second network packets outputted from an SVM hosted by a second server, each network packet of the corresponding second network packets having similarly converted one or more fields of each TCP/IP header. For these examples, send module 922-3 may forward the first network packet with the converted one or more fields to the COLO manager.

FIG. 11 illustrates an example of a first storage medium. As shown in FIG. 11, the first storage medium includes a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
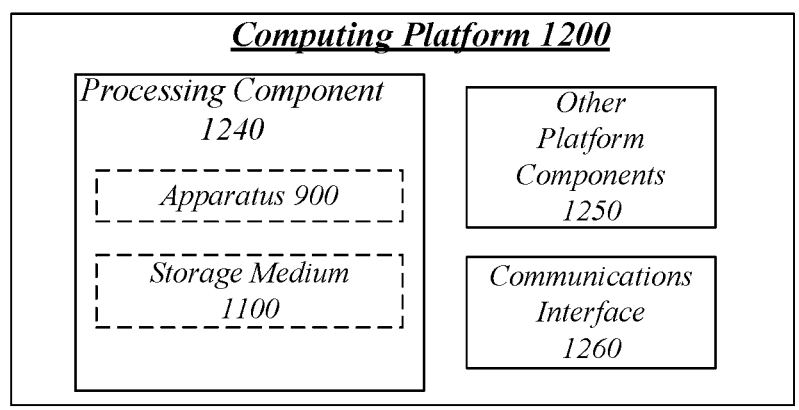
FIG. 12 illustrates an example computing platform.

FIG. 12 illustrates an example computing platform 1200. In some examples, as shown in FIG. 12, computing platform 1200 may include a processing component 1240, other platform components 1250 or a communications interface 1260. According to some examples, computing platform 1200 may be implemented in server or node computing device deployed in a data center and capable of coupling to external network via a NW communication channel.

According to some examples, processing component 1240 may execute processing operations or logic for apparatus 900 and/or storage medium 1100. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1200 may be implemented in a server or node computing device deployed in a data center. Accordingly, functions and/or specific configurations of computing platform 1200 described herein, may be included or omitted in various embodiments of computing platform 1200, as suitably desired for a server or node computing device deployed in a data center.

The components and features of computing platform 1200 may be implemented using any combination of discrete circuitry, application specific integrated circuits (ASICs), logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry and an intercept module for execution by the circuitry to intercept first network packets outputted from a PVM hosted by a first server. Each network packet of the first network packets may have a TCP/IP header. The apparatus may also include a conversion module for execution by the circuitry to convert one or more fields of each TCP/IP header to more predictable or deterministic values while maintaining TCP/IP semantics for each respectively converted field in each TCP/IP header. For these examples, the one or more fields may include at least one of a TCP sequence number field, an IP header ID field, a timestamp field or a TCP window size field.

Example 2

The apparatus of example 1 may also include a send module for execution by the circuitry to forward the first network packets with the converted one or more fields to a COLO manager. The COLO manager may determine output-packet-similarity of the first network packets compared to corresponding second network packets outputted from a SVM hosted by a second server. For these examples, each network packet of the corresponding second network packets having similarly converted one or more fields of each TCP/IP header.

Example 3

The apparatus of example 2, the COLO may be arranged to determine output-packet-similarity based on a first time interval during which content matched between one or more of the first network packets outputted from the PVM and one or more of the second network packets outputted from the SVM. The similarly converted one or more fields of each TCP/IP header for both the first network packets and the second network packets may increase a likelihood that the first time interval is greater than a second time interval during which content matched between non-converted one or more fields of each TCP/IP header for both the first network packets and the second network packets respectfully outputted from the PVM and the SVM.

Example 4

The apparatus of example 2, the conversion module may convert the TCP sequence number field accessing a first namespace including first original TCP sequence numbers randomly generated by a first operating system executed by the PVM using a first randomization value. The conversion module may then access a second namespace including first conversion TCP sequence numbers randomly generated using a second randomization value. The conversion module may then map each first original TCP sequence number from the first namespace to each first conversion TCP sequence number from the second namespace to generate a first conversion map. The conversion module may then identify each first original TCP sequence number included in respective TCP sequence number fields of the respective TCP/IP headers for the intercepted first network packets. The conversion module may then convert each identified first original TCP sequence number from the first namespace to a first conversion TCP sequence number from the second namespace using the conversion map and insert each of first conversion TCP sequence numbers in the TCP sequence number field of the first network packets.

Example 5

The apparatus of example 4, the first and second randomization values may be different randomization values.

Example 6

The apparatus of example 5, the second randomization value may be capable of being relayed to the SVM to synchronize the second namespace with a third namespace that includes second conversion TCP sequence numbers randomly generated using the second randomization value. For these examples, each second conversion TCP sequence number from the third namespace may be capable of being mapped to each second original TCP sequence number included in a fourth namespace having second original TCP sequence numbers randomly generated by a second operating system executed by the SVM using the first randomization value. The mapped second conversion TCP sequence numbers to the second conversion TCP sequence numbers may generate a second conversion map that is substantially similar to the first conversion map. The second conversion map may be used to convert TCP sequence number fields of each network packet of the corresponding second network packets outputted from the SVM.

Example 7

The apparatus of example 4 may also include a reorder module for execution by the circuitry to reorder the intercepted first network packets based on the first conversion TCP sequence numbers included in each converted TCP sequence number field of the respective TCP/IP headers for the intercepted one or more first network packets by the conversion module. For these examples, the intercepted first network packets may be reordered such that the first conversion TCP sequence numbers are in a sequential order.

Example 8

The apparatus of example 2, the conversion module may convert the IP header ID field by accessing a first namespace including first original IP header ID randomly generated by a first operating system executed by the PVM using a first randomization value. The conversion module may then access a second namespace including first conversion IP header ID randomly generated using a second randomization value. The conversion module may then map each first original IP header ID from the first namespace to each first conversion IP header ID from the second namespace to generate a first conversion map. The conversion module may then identify each first original IP header ID included in respective IP header ID fields of the respective TCP/IP headers for the intercepted first network packets. The conversion module may then convert each identified first original IP header ID from the first namespace to a first conversion IP header ID from the second namespace using the conversion map and insert each of first conversion IP header ID in the IP header ID field of the first network packets.

Example 9

The apparatus of example 8, the first and second randomization values may be different randomization values.

Example 10

The apparatus of example 8, the second randomization value may be capable of being relayed to the SVM to synchronize the second namespace with a third namespace that includes second conversion IP header ID randomly generated using the second randomization value. Each second conversion IP header ID from the third namespace may be capable of being mapped to each second original IP header ID included in a fourth namespace having second original IP header ID randomly generated by a second operating system executed by the SVM using the first randomization value. The mapped second conversion IP header ID to the second conversion IP header ID may generate a second conversion map that is substantially similar to the first conversion map. The second conversion map may be used to convert IP header ID fields of each network packet of the corresponding second network packets outputted from the SVM.

Example 11

The apparatus of example 8 may also include a reorder module for execution by the circuitry to reorder the intercepted first network packets based on the first conversion IP header ID included in each converted IP header ID field of the respective TCP/IP headers for the intercepted one or more first network packets. The intercepted first network packets may be reordered such that the first conversion IP header ID are in a sequential order.

Example 12

The apparatus of example 1, the conversion module may convert the timestamp field by converting each original timestamp value included in respective timestamp fields of TCP/IP headers of intercepted first network packets with respective conversion timestamp values. Each conversion timestamp value may be rounded to fewer significant figures compared to a respective original timestamp value.

Example 13

The apparatus of example 1, the conversion module may convert the TCP window size field by converting each original TCP window size value included in respective TCP window size fields of TCP/IP headers of intercepted first network packets with respective conversion TCP window size values. Each conversion TCP window size value may be increased or decreased to a nearest set TCP window size from among one or more set TCP window sizes.

Example 14

The apparatus of example 1 may also include a digital display coupled to the circuitry to present a user interface view.

Example 15

An example method may include intercepting first network packets outputted from a PVM hosted by a first server, each network packet of the first network packets having a TCP/IP header. The method may also include converting one or more fields of each TCP/IP header to more predictable or deterministic values while maintaining TCP/IP semantics for each respectively converted field in each TCP/IP header. For these examples, the one or more fields may include at least one of a TCP sequence number field, an IP header ID field, a timestamp field or a TCP window size field.

Example 16

The method of example 15 may also include forwarding the first network packets with the converted one or more fields to a COLO manager. The COLO manager may be capable of determining output-packet-similarity of the first network packets compared to corresponding second network packets outputted from a SVM hosted by a second server. Each network packet of the corresponding second network packets may have similarly converted one or more fields of each TCP/IP header.

Example 17

The method of example 16, the COLO manager may be arranged to determine output-packet-similarity based on a first time interval during which content matched between one or more of the first network packets outputted from the PVM and one or more of the second network packets outputted from the SVM. The similarly converted one or more fields of each TCP/IP for both the first network packets and the second network packets may increase a likelihood that the first time interval is greater than a second time interval during which content matched between non-converted one or more fields of each TCP/IP header for both the first network packets and the second network packets respectfully outputted from the PVM and the SVM.

Example 18

The method of example 16, converting the TCP sequence number field may include accessing a first namespace including first original TCP sequence numbers randomly generated by a first operating system executed by the PVM using a first randomization value. Converting the TCP sequence number field may also include accessing a second namespace including first conversion TCP sequence numbers randomly generated using a second randomization value. Converting the TCP sequence number field may also include mapping each first original TCP sequence number from the first namespace to each first conversion TCP sequence number from the second namespace to generate a first conversion map. Converting the TCP sequence number field may also include identifying each first original TCP sequence number included in respective TCP sequence number fields of the respective TCP/IP headers for the intercepted first network packets. Converting the TCP sequence number field may also include converting each identified first original TCP sequence number from the first namespace to a first conversion TCP sequence number from the second namespace using the conversion map and inserting each of first conversion TCP sequence numbers in the TCP sequence number field of the first network packets.

Example 19

The method of example 18, the first and second randomization values may be different randomization values.

Example 20

The method of example 18, the second randomization value may be capable of being relayed to the SVM to synchronize the second namespace with a third namespace that includes second conversion TCP sequence numbers randomly generated using the second randomization value. Each second conversion TCP sequence number from the third namespace may be capable of being mapped to each second original TCP sequence number included in a fourth namespace having second original TCP sequence numbers randomly generated by a second operating system executed by the SVM using the first randomization value. The mapped second conversion TCP sequence numbers to the second conversion TCP sequence numbers may generate a second conversion map that is substantially similar to the first conversion map. The second conversion map may be used to convert TCP sequence number fields of each network packet of the corresponding second network packets outputted from the SVM.

Example 21

The method of example 18 may also include reordering the intercepted first network packets based on the first conversion TCP sequence numbers included in each converted TCP sequence number field of the respective TCP/IP headers for the intercepted one or more first network packets. The intercepted first network packets may be reordered such that the first conversion TCP sequence numbers are in a sequential order.

Example 22

The method of example 16, converting the IP header ID field may include accessing a first namespace including first original IP header ID randomly generated by a first operating system executed by the PVM using a first randomization value. Converting the IP header ID field may also include accessing a second namespace including first conversion IP header ID randomly generated using a second randomization value. Converting the IP header ID field may also include mapping each first original IP header ID from the first namespace to each first conversion IP header ID from the second namespace to generate a first conversion map. Converting the IP header ID field may also include identifying each first original IP header ID included in respective IP header ID fields of the respective TCP/IP headers for the intercepted first network packets. Converting the IP header ID field may also include converting each identified first original IP header ID from the first namespace to a first conversion IP header ID from the second namespace using the conversion map and inserting each of first conversion IP header ID in the IP header ID field of the first network packets.

Example 23

The method of example 22, the first and second randomization values may be different randomization values.

Example 24

The method of example 22, the second randomization value may be capable of being relayed to the SVM to synchronize the second namespace with a third namespace that includes second conversion IP header ID randomly generated using the second randomization value, each second conversion IP header ID from the third namespace capable of being mapped to each second original IP header ID included in a fourth namespace having second original IP header ID randomly generated by a second operating system executed by the SVM using the first randomization value. The mapped second conversion IP header ID to the second conversion IP header ID may generate a second conversion map that may be substantially similar to the first conversion map. The second conversion map may be used to convert IP header ID fields of each network packet of the corresponding second network packets outputted from the SVM.

Example 25

The method of example 22 may also include reordering the intercepted first network packets based on the first conversion IP header ID included in each converted IP header ID field of the respective TCP/IP headers for the intercepted one or more first network packets. The intercepted first network packets may be reordered such that the first conversion IP header ID are in a sequential order.

Example 26

The method of example 15, converting the timestamp field may include converting each original timestamp value included in respective timestamp fields of TCP/IP headers of intercepted first network packets with respective conversion timestamp values. Each conversion timestamp value may be rounded to fewer significant figures compared to a respective original timestamp value.

Example 27

The method of example 15, converting the TCP window size field may include converting each original TCP window size value included in respective TCP window size fields of TCP/IP headers of intercepted first network packets with respective conversion TCP window size values. Each conversion TCP window size value may be increased or decreased to a nearest set TCP window size from among one or more set TCP window sizes.

Example 28

An example at least one machine readable medium may include a plurality of instructions that in response to being executed by system at a computing platform may cause the system to carry out a method according to any one of examples 15 to 27.

Example 29

An example apparatus may include means for performing the methods of any one of examples 15 to 27.

Example 30

An example at least one non-transitory machine readable medium may include a plurality of instructions that in response to being executed by a system implemented on a computing platform may cause the system to intercept first network packets outputted from a PVM hosted by a first server. Each network packet of the first network packets may have a TCP/IP header. The instructions may also cause the system to convert one or more fields of each TCP/IP header to more predictable or deterministic values while maintaining TCP/IP semantics for each respectively converted field in each TCP/IP header. The one or more fields may include at least one of a TCP sequence number field, an IP header ID field, a timestamp field or a TCP window size field.

Example 31

The at least one non-transitory machine readable medium of example 30, the instructions to further cause the system to forward the first network packets with the converted one or more fields to a COLO manager. The COLO manager may be capable of determining output-packet-similarity of the first network packets compared to corresponding second network packets outputted from a SVM hosted by a second server. Each network packet of the corresponding second network packets may have been similarly converted one or more fields of each TCP/IP header.

Example 32

The at least one non-transitory machine readable medium of example 31, the COLO may determine output-packet-similarity based on a first time interval during which content matched between one or more of the first network packets outputted from the PVM and one or more of the second network packets outputted from the SVM. The similarly converted one or more fields of each TCP/IP header for both the first network packets and the second network packets may increase a likelihood that the first time interval is greater than a second time interval during which content matched between non-converted one or more fields of each TCP/IP header for both the first network packets and the second network packets respectfully outputted from the PVM and the SVM.

Example 33

The at least one non-transitory machine readable medium of example 31, to convert the TCP sequence number field may include the instructions to cause the system to access a first namespace including first original TCP sequence numbers randomly generated by a first operating system executed by the PVM using a first randomization value. The instructions may also cause the system to access a second namespace including first conversion TCP sequence numbers randomly generated using a second randomization value. The instructions may also cause the system to map each first original TCP sequence number from the first namespace to each first conversion TCP sequence number from the second namespace to generate a first conversion map. The instructions may also cause the system to identify each first original TCP sequence number included in respective TCP sequence number fields of the respective TCP/IP headers for the intercepted first network packets. The instructions may also cause the system to convert each identified first original TCP sequence number from the first namespace to a first conversion TCP sequence number from the second namespace using the conversion map and insert each of first conversion TCP sequence numbers in the TCP sequence number field of the first network packets.

Example 34

The at least one non-transitory machine readable medium of example 33, the first and second randomization values may be different randomization values.

Example 35

The at least one non-transitory machine readable medium of example 33, the second randomization value may be capable of being relayed to the SVM to synchronize the second namespace with a third namespace that includes second conversion TCP sequence numbers randomly generated using the second randomization value. Each second conversion TCP sequence number from the third namespace may be capable of being mapped to each second original TCP sequence number included in a fourth namespace having second original TCP sequence numbers randomly generated by a second operating system executed by the SVM using the first randomization value. The mapped second conversion TCP sequence numbers to the second conversion TCP sequence numbers may generate a second conversion map that is substantially similar to the first conversion map. The second conversion map may be used to convert TCP sequence number fields of each network packet of the corresponding second network packets outputted from the SVM.

Example 36

The at least one non-transitory machine readable medium of example 33, the instructions may further cause the system to reorder the intercepted first network packets based on the first conversion TCP sequence numbers included in each converted TCP sequence number field of the respective TCP/IP headers for the intercepted one or more first network packets. The intercepted first network packets may be reordered such that the first conversion TCP sequence numbers are in a sequential order.

Example 37

The at least one non-transitory machine readable medium of example 31, to convert the IP header ID field may include the instructions to cause the system to access a first namespace including first original IP header ID randomly generated by a first operating system executed by the PVM using a first randomization value. The instructions may also cause the system to access a second namespace including first conversion IP header ID randomly generated using a second randomization value. The instructions may also cause the system to map each first original IP header ID from the first namespace to each first conversion IP header ID from the second namespace to generate a first conversion map. The instructions may also cause the system to identify each first original IP header ID included in respective IP header ID fields of the respective TCP/IP headers for the intercepted first network packets. The instructions may also cause the system to convert each identified first original IP header ID from the first namespace to a first conversion IP header ID from the second namespace using the conversion map and insert each of first conversion IP header ID in the IP header ID field of the first network packets.

Example 38

The at least one non-transitory machine readable medium of example 37, the first and second randomization values may be different randomization values.

Example 39

The at least one non-transitory machine readable medium of example 37, the second randomization value may be capable of being relayed to the SVM to synchronize the second namespace with a third namespace that includes second conversion IP header ID randomly generated using the second randomization value. Each second conversion IP header ID from the third namespace may be capable of being mapped to each second original IP header ID included in a fourth namespace having second original IP header ID randomly generated by a second operating system executed by the SVM using the first randomization value. The mapped second conversion IP header ID to the second conversion IP header ID may generate a second conversion map that is substantially similar to the first conversion map, the second conversion map may be used to convert IP header ID fields of each network packet of the corresponding second network packets outputted from the SVM.

Example 40

The at least one non-transitory machine readable medium of example 37, the instructions may cause the system to reorder the intercepted first network packets based on the first conversion IP header ID included in each converted IP header ID field of the respective TCP/IP headers for the intercepted one or more first network packets. The intercepted first network packets may be reordered such that the first conversion IP header ID are in a sequential order.

Example 41

The at least one non-transitory machine readable medium of example 30, to convert the timestamp field may include the instructions to cause the system to convert each original timestamp value included in respective timestamp fields of TCP/IP headers of intercepted first network packets with respective conversion timestamp values. Each conversion timestamp value may be rounded to fewer significant figures compared to a respective original timestamp value.

Example 42

The at least one non-transitory machine readable medium of example 30, to convert the TCP window size field may include the instructions to cause the system to convert each original TCP window size value included in respective TCP window size fields of TCP/IP headers of intercepted first network packets with respective conversion TCP window size values. Each conversion TCP window size value may be increased or decreased to a nearest set TCP window size from among one or more set TCP window sizes.

Example 43

An example method may include intercepting first network packets outputted from a PVM hosted by a first server. Each network packet of the first network packets may have a protocol header. The methods may also include converting one or more fields of each protocol header to more predictable or deterministic values while maintaining protocol semantics for each respectively converted field in each protocol header. The one or more fields may include at least one of a sequence number field, a header identification (ID) field, a timestamp field or a window size field.

Example 44

The method of example 43 may also include forwarding the first network packets with the converted one or more fields to a COLO manager. The COLO manager may be capable of determining output-packet-similarity of the first network packets compared to corresponding second network packets outputted from a SVM hosted by a second server. Each network packet of the corresponding second network packets may have been similarly converted one or more fields of each protocol header.

Example 45

The method of example 44, the COLO manager may be arranged to determine output-packet-similarity based on a first time interval during which content matched between one or more of the first network packets outputted from the PVM and one or more of the second network packets outputted from the SVM. The similarly converted one or more fields of each protocol header for both the first network packets and the second network packets may increase a likelihood that the first time interval is greater than a second time interval during which content matched between non-converted one or more fields of each protocol header for both the first network packets and the second network packets respectfully outputted from the PVM and the SVM.

Example 46

The method of example 44, converting the sequence number field may include accessing a first namespace including first original sequence numbers randomly generated by a first operating system executed by the PVM using a first randomization value. Converting the sequence number field may also include accessing a second namespace including first conversion sequence numbers randomly generated using a second randomization value. Converting the sequence number field may also include mapping each first original sequence number from the first namespace to each first conversion sequence number from the second namespace to generate a first conversion map. Converting the sequence number field may also include identifying each first original sequence number included in respective sequence number fields of the respective protocol headers for the intercepted first network packets. Converting the sequence number field may also include converting each identified first original sequence number from the first namespace to a first conversion sequence number from the second namespace using the conversion map and inserting each of first conversion sequence numbers in the sequence number field of the first network packets.

Example 47

The method of example 46, the first and second randomization values may be different randomization values.

Example 48

The method of example 46, the second randomization value may be capable of being relayed to the SVM to synchronize the second namespace with a third namespace that includes second conversion sequence numbers randomly generated using the second randomization value. Each second conversion sequence number from the third namespace may be capable of being mapped to each second original sequence number included in a fourth namespace having second original sequence numbers randomly generated by a second operating system executed by the SVM using the first randomization value. The mapped second conversion sequence numbers to the second conversion sequence numbers may generate a second conversion map that is substantially similar to the first conversion map, the second conversion map used to convert sequence number fields of each network packet of the corresponding second network packets outputted from the SVM.

Example 49

The method of example 46 may also include reordering the intercepted first network packets based on the first conversion sequence numbers included in each converted sequence number field of the respective protocol headers for the intercepted one or more first network packets. The intercepted first network packets may be reordered such that the first conversion sequence numbers are in a sequential order.

Example 50

The method of example 44, converting the header ID field may include accessing a first namespace including first original header ID randomly generated by a first operating system executed by the PVM using a first randomization value. Converting the header ID field may also include accessing a second namespace including first conversion header ID randomly generated using a second randomization value. Converting the header ID field may also include mapping each first original header ID from the first namespace to each first conversion header ID from the second namespace to generate a first conversion map. Converting the header ID field may also include identifying each first original header ID included in respective header ID fields of the respective protocol headers for the intercepted first network packets. Converting the header ID field may also include converting each identified first original header ID from the first namespace to a first conversion header ID from the second namespace using the conversion map and inserting each of first conversion header ID in the header ID field of the first network packets.

Example 51

The method of example 50, the first and second randomization values may be different randomization values.

Example 52

The method of example 50, the second randomization value may be capable of being relayed to the SVM to synchronize the second namespace with a third namespace that includes second conversion header ID randomly generated using the second randomization value. Each second conversion header ID from the third namespace may be capable of being mapped to each second original header ID included in a fourth namespace having second original header ID randomly generated by a second operating system executed by the SVM using the first randomization value. The mapped second conversion header ID to the second conversion header ID may generate a second conversion map that may be substantially similar to the first conversion map. The second conversion map may be used to convert header ID fields of each network packet of the corresponding second network packets outputted from the SVM.

Example 53

The method of example 50 may also include reordering the intercepted first network packets based on the first conversion header ID included in each converted header ID field of the respective protocol headers for the intercepted one or more first network packets. The intercepted first network packets may be reordered such that the first conversion header ID are in a sequential order.

Example 54

The method of example 43, converting the timestamp field may include converting each original timestamp value included in respective timestamp fields of protocol headers of intercepted first network packets with respective conversion timestamp values. Each conversion timestamp value may be rounded to fewer significant figures compared to a respective original timestamp value.

Example 55

The method of example 43, converting the window size field may include converting each original window size value included in respective window size fields of protocol headers of intercepted first network packets with respective conversion window size values. Each conversion window size value may be increased or decreased to a nearest set window size from among one or more set window sizes.

Example 56

The method of example 43, the protocol header may include a transport control protocol/internet protocol (TCP/IP) header. The sequence number field may be an IP sequence number field, the header ID field may be an IP header ID field, the window size field may be a TCP window size field.

Example 57

At least one machine readable medium comprising a plurality of instructions that in response to being executed by system at a computing platform may cause the system to carry out a method according to any one of examples 43 to 55.

Example 57

An apparatus comprising means for performing the methods of any one of examples 43 to 55.

Example 58

An example apparatus may include an intercept module for execution by the circuitry to intercept first network packets outputted from a PVM hosted by a first server. Each network packet of the first network packets may have a protocol header. The apparatus may also include a conversion module for execution by the circuitry to converting one or more fields of each protocol header to more deterministic values while maintaining protocol semantics for each respectively converted field in each protocol header. The one or more fields may include at least one of a sequence number field, a header identification (ID) field, a timestamp field or a window size field.

Example 59

The apparatus of example 58 may also include a send module for execution by the circuitry to forward the first network packets with the converted one or more fields to a COLO manager. The COLO manager capable of determining output-packet-similarity of the first network packets compared to corresponding second network packets outputted from an SVM hosted by a second server. Each network packet of the corresponding second network packets may have similarly converted one or more fields of each protocol header.

Example 60

The apparatus of example 59, the COLO manager may be arranged to determine output-packet-similarity based on a first time interval during which content matched between one or more of the first network packets outputted from the PVM and one or more of the second network packets outputted from the SVM. The similarly converted one or more fields of each protocol header for both the first network packets and the second network packets may increase a likelihood that the first time interval is greater than a second time interval during which content matched between non-converted one or more fields of each protocol header for both the first network packets and the second network packets respectfully outputted from the PVM and the SVM.

Example 61

The apparatus of example 59, the conversion module may convert the sequence number field by the conversion module accessing a first namespace including first original sequence numbers randomly generated by a first operating system executed by the PVM using a first randomization value. The conversion module may also access a second namespace including first conversion sequence numbers randomly generated using a second randomization value. The conversion module may also map each first original sequence number from the first namespace to each first conversion sequence number from the second namespace to generate a first conversion map. The conversion module may also identify each first original sequence number included in respective sequence number fields of the respective protocol headers for the intercepted first network packets. The conversion module may also convert each identified first original sequence number from the first namespace to a first conversion sequence number from the second namespace using the conversion map. The conversion module may also insert each of first conversion sequence numbers in the sequence number field of the first network packets.

Example 62

The apparatus of example 61, the first and second randomization values may be different randomization values.

Example 63

The apparatus of example 61, the second randomization value may be capable of being relayed to the SVM to synchronize the second namespace with a third namespace that includes second conversion sequence numbers randomly generated using the second randomization value. Each second conversion sequence number from the third namespace may be capable of being mapped to each second original sequence number included in a fourth namespace having second original sequence numbers randomly generated by a second operating system executed by the SVM using the first randomization value. The mapped second conversion sequence numbers to the second conversion sequence numbers may generate a second conversion map that is substantially similar to the first conversion map. The second conversion map may be used to convert sequence number fields of each network packet of the corresponding second network packets outputted from the SVM.

Example 64

The apparatus of example 61 may also include a reorder module for execution by the circuitry to reorder the intercepted first network packets based on the first conversion sequence numbers included in each converted sequence number field of the respective protocol headers for the intercepted one or more first network packets. The intercepted first network packets may be reordered such that the first conversion sequence numbers are in a sequential order.

Example 65

The apparatus of example 59, the conversion module may convert the header ID field by the conversion module accessing a first namespace including first original header ID randomly generated by a first operating system executed by the PVM using a first randomization value. The conversion module may also access a second namespace including first conversion header ID randomly generated using a second randomization value. The conversion module may also map each first original header ID from the first namespace to each first conversion header ID from the second namespace to generate a first conversion map. The conversion module may also identify each first original header ID included in respective header ID fields of the respective protocol headers for the intercepted first network packets. The conversion module may also convert each identified first original header ID from the first namespace to a first conversion header ID from the second namespace using the conversion map. The conversion module may also insert each of first conversion header ID in the header ID field of the first network packets.

Example 66

The apparatus of example 65, the first and second randomization values may be different randomization values.

Example 67

The apparatus of example 65, the second randomization value capable of being relayed to the SVM to synchronize the second namespace with a third namespace that includes second conversion header ID randomly generated using the second randomization value. Each second conversion header ID from the third namespace may be capable of being mapped to each second original header ID included in a fourth namespace having second original header ID randomly generated by a second operating system executed by the SVM using the first randomization value. The mapped second conversion header ID to the second conversion header ID may generate a second conversion map that is substantially similar to the first conversion map. The second conversion map may be used to convert header ID fields of each network packet of the corresponding second network packets outputted from the SVM.

Example 68

The apparatus of example 65 may also include a reorder module for execution by the circuitry to reorder the intercepted first network packets based on the first conversion header ID included in each converted header ID field of the respective protocol headers for the intercepted one or more first network packets. The intercepted first network packets may be reordered such that the first conversion header ID are in a sequential order.

Example 69

The apparatus of example 68, the conversion module may convert the timestamp field by the conversion module converting each original timestamp value included in respective timestamp fields of protocol headers of intercepted first network packets with respective conversion timestamp values. Each conversion timestamp value may be rounded to fewer significant figures compared to a respective original timestamp value.

Example 70

The apparatus of example 58, the conversion module to convert the window size field by the conversion module converting each original window size value included in respective window size fields of protocol headers of intercepted first network packets with respective conversion window size values. Each conversion window size value may be increased or decreased to a nearest set window size from among one or more set window sizes.

Example 71

The apparatus of example 58, the protocol header may be a transport control protocol/internet protocol (TCP/IP) header, the sequence number field may be an IP sequence number field, the header ID field may be an IP header ID field and the window size field may be a TCP window size field.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
   circuitry; and
   logic for execution by the circuitry to:
      intercept first network packets outputted from a primary virtual machine (PVM) hosted by a first server, each network packet of the first network packets having a transport control protocol/internet protocol (TCP/IP) header, one or more fields of each TCP/IP header generated using a first randomization value of a first namespace, the first namespace comprising a plurality of values generated using the first randomization value;

identify the one or more fields of each TCP/IP header in a conversion map, the conversion map to map each respective value of the plurality of values of the first namespace to a respective value of a plurality of values of a second namespace, the values of the second namespace generated using a second randomization value;

convert the identified one or more fields of each TCP/IP header from the first namespace to the respective value of the second namespace specified in the conversion map, the one or more fields comprising at least one of a TCP sequence number field or an IP header identification (ID) field; and forward the first network packets with the converted one or more fields to a coarse-grained lock-stepping (COLO) manager, the COLO manager to determine output-packet-similarity of the first network packets compared to corresponding second network packets outputted from a secondary virtual machine (SVM) hosted by a second server, each network packet of the corresponding second network packets having similarly converted one or more fields of each TCP/IP header, the COLO manager to determine output-packet-similarity based on a first time interval during which content matched between one or more of the first network packets outputted from the PVM and one or more of the second network packets outputted from the SVM, the similarly converted one or more fields of each TCP/IP header for both the first network packets and the second network packets to increase a likelihood that the first time interval is greater than a second time interval during which content matched between non-converted one or more fields of each TCP/IP header for both the first network packets and the second network packets respectively outputted from the PVM and the SVM.

2. The apparatus of claim 1, comprising logic to convert the TCP sequence number field for execution by the circuitry to:

access the first namespace including first original TCP sequence numbers generated by a first operating system of the PVM using the first randomization value;

access the second namespace including first conversion TCP sequence numbers generated using the second randomization value;

map each first original TCP sequence number from the first namespace to each first conversion TCP sequence number from the second namespace to generate the conversion map;

identify each first original TCP sequence number included in respective TCP sequence number fields of the respective TCP/IP headers for the intercepted first network packets;

convert each identified first original TCP sequence number from the first namespace to a first conversion TCP sequence number from the second namespace using the conversion map; and insert each of first conversion TCP sequence numbers in the TCP sequence number field of the first network packets.

3. The apparatus of claim 2, comprising logic for execution by the circuitry to:

reorder the intercepted first network packets based on the first conversion TCP sequence numbers included in each converted TCP sequence number field of the respective TCP/IP headers for the intercepted one or more first network packets, the intercepted first network packets reordered such that the first conversion TCP sequence numbers are in a sequential order.

4. The apparatus of claim 1, comprising logic to convert the IP header ID field for execution by the circuitry to:

access the first namespace including first original IP header ID generated by a first operating system of the PVM executed by the PVM using the first randomization value;

access the second namespace including first conversion IP header ID generated using the second randomization value;

map each first original IP header ID from the first namespace to each first conversion IP header ID from the second namespace to generate the conversion map;

identify each first original IP header ID included in respective IP header ID fields of the respective TCP/IP headers for the intercepted first network packets;

convert each identified first original IP header ID from the first namespace to a first conversion IP header ID from the second namespace using the conversion map; and insert each of first conversion IP header ID in the IP header ID field of the first network packets.

5. The apparatus of claim 4, comprising logic for execution by the circuitry to:

reorder the intercepted first network packets based on the first conversion IP header ID included in each converted IP header ID field of the respective TCP/IP headers for the intercepted one or more first network packets, the intercepted first network packets reordered such that the first conversion IP header ID are in a sequential order.

6. The apparatus of claim 1, the one or more fields comprising a timestamp field, the logic for execution by the circuitry to:

convert each original timestamp value included in respective timestamp fields of TCP/IP headers of intercepted first network packets with respective conversion timestamp values, each conversion timestamp value rounded to fewer significant figures compared to a respective original timestamp value.

7. The apparatus of claim 1, the one or more fields comprising a TCP window size field, the logic for execution by the circuitry to:

convert each original TCP window size value included in respective TCP window size fields of TCP/IP headers of intercepted first network packets with respective conversion TCP window size values, each conversion TCP window size value increased or decreased to a nearest set TCP window size from among one or more set TCP window sizes.

8. The apparatus of claim 1, comprising a digital display coupled to the circuitry to present a user interface view.

9. A method comprising:

intercepting first network packets outputted from a primary virtual machine (PVM) hosted by a first server, each network packet of the first network packets having a transport control protocol/internet protocol (TCP/IP) header, one or more fields of each TCP/IP header generated using a first randomization value of a first namespace, the first namespace comprising a plurality of values generated using the first randomization value;

identifying the one or more fields of each TCP/IP header in a conversion map, the conversion map mapping each respective value of the plurality of values of the first namespace to a respective value of a plurality of values of a second namespace, the values of the second namespace generated using a second randomization value; and converting the identified one or more fields of each TCP/IP header from the first namespace to the respective value of the second namespace specified in the conversion map, the one or more fields comprising at least one of a TCP sequence number field or an IP header identification (ID) field; and forwarding the first network packets with the converted one or more fields to a coarse-grained lock-stepping (COLO) manager, the COLO manager capable of determining output-packet-similarity of the first network packets compared to corresponding second network packets outputted from a secondary virtual machine (SVM) hosted by a second server, each network packet of the corresponding second network packets having similarly converted one or more fields of each TCP/IP header, the COLO manager to determine output-packet-similarity based on a first time interval during which content matched between one or more of the first network packets outputted from the PVM and one or more of the second network packets outputted from the SVM, the similarly converted one or more fields of each TCP/IP header for both the first network packets and the second network packets to increase a likelihood that the first time interval is greater than a second time interval during which content matched between non-converted one or more fields of each TCP/IP header for both the first network packets and the second network packets respectively outputted from the PVM and the SVM.

10. The method of claim 9, converting the TCP sequence number field comprising:

accessing the first namespace including first original TCP sequence numbers generated by a first operating system of the PVM using the first randomization value;

accessing the second namespace including first conversion TCP sequence numbers generated using the second randomization value;

mapping each first original TCP sequence number from the first namespace to each first conversion TCP sequence number from the second namespace to generate the conversion map;

identifying each first original TCP sequence number included in respective TCP sequence number fields of the respective TCP/IP headers for the intercepted first network packets;

converting each identified first original TCP sequence number from the first namespace to a first conversion TCP sequence number from the second namespace using the conversion map; and inserting each of first conversion TCP sequence numbers in the TCP sequence number field of the first network packets.

11. The method of claim 10, wherein the first and second randomization values are different randomization values.

12. The method of claim 11, the second randomization value capable of being relayed to the SVM to synchronize the second namespace with a third namespace that includes second conversion TCP sequence numbers generated using the second randomization value, each second conversion TCP sequence number from the third namespace capable of being mapped to each second original TCP sequence number included in a fourth namespace having second original TCP sequence numbers generated by a first operating system of the PVM using the first randomization value, the mapped second conversion TCP sequence numbers to the second conversion TCP sequence numbers to generate a second conversion map that is substantially similar to the conversion map, the second conversion map used to convert TCP sequence number fields of each network packet of the corresponding second network packets outputted from the SVM.

13. The method of claim 11, comprising:

reordering the intercepted first network packets based on the first conversion TCP sequence numbers included in each converted TCP sequence number field of the respective TCP/IP headers for the intercepted one or more first network packets, the intercepted first network packets reordered such that the first conversion TCP sequence numbers are in a sequential order.

14. The method of claim 9, converting a timestamp field of the one or more fields comprising:

converting each original timestamp value included in respective timestamp fields of TCP/IP headers of intercepted first network packets with respective conversion timestamp values, each conversion timestamp value rounded to fewer significant figures compared to a respective original timestamp value.

15. The method of claim 9, converting a TCP window size field of the one or more fields comprising:

converting each original TCP window size value included in respective TCP window size fields of TCP/IP headers of intercepted first network packets with respective conversion TCP window size values, each conversion TCP window size value increased or decreased to a nearest set TCP window size from among one or more set TCP window sizes.

16. At least one non-transitory machine readable medium comprising a plurality of instructions that in response to being executed by a system implemented on a computing platform cause the system to:

intercept first network packets outputted from a primary virtual machine (PVM) hosted by a first server, each network packet of the first network packets having a transport control protocol/internet protocol (TCP/IP) header, one or more fields of each TCP/IP header generated using a first randomization value of a first namespace, the first namespace comprising a plurality of values generated using the first randomization value;

identify the one or more fields of each TCP/IP header in a conversion map, the conversion map to map each respective value of the plurality of values of the first namespace to a respective value of a plurality of values of a second namespace, the values of the second namespace generated using a second randomization value; and convert identified one or more fields of each TCP/IP header from the first namespace to the respective value of the second namespace specified in the conversion map, the one or more fields comprising at least one of a TCP sequence number field or an IP header identification (ID) field; and forward the first network packets with the converted one or more fields to a coarse-grained lock-stepping (COLO) manager, the COLO manager to determine output-packet-similarity of the first network packets compared to corresponding second network packets outputted from a secondary virtual machine (SVM) hosted by a second server, each network packet of the corresponding second network packets having similarly converted one or more fields of each TCP/IP header, the COLO manager to determine outputpacket-similarity based on a first time interval during which content matched between one or more of the first network packets outputted from the PVM and one or more of the second network packets outputted from the SVM, the similarly converted one or more fields of each TCP/IP header for both the first network packets and the second network packets to increase a likelihood that the first time interval is greater than a second time interval during which content matched between non-converted one or more fields of each TCP/IP header for both the first network packets and the second network packets respectively outputted from the PVM and the SVM.

17. The at least one non-transitory machine readable medium of claim 16, to convert the IP header ID field comprises the instructions to cause the system to:
  access the first namespace including first original IP header ID generated by a first operating system of the PVM using the first randomization value;
  access the second namespace including first conversion IP header ID generated using the second randomization value;
  map each first original IP header ID from the first namespace to each first conversion IP header ID from the second namespace to generate the conversion map;
  identify each first original IP header ID included in respective IP header ID fields of the respective TCP/IP headers for the intercepted first network packets;
  convert each identified first original IP header ID from the first namespace to a first conversion IP header ID from the second namespace using the conversion map; and
  insert each of first conversion IP header ID in the IP header ID field of the first network packets.

18. The at least one non-transitory machine readable medium of claim 17, wherein the first and second randomization values are different randomization values.

19. The at least one non-transitory machine readable medium of claim 17, the second randomization value capable of being relayed to the SVM to synchronize the second namespace with a third namespace that includes second conversion IP header ID generated using the second randomization value, each second conversion IP header ID from the third namespace capable of being mapped to each second original IP header ID included in a fourth namespace having second original IP header ID generated by an operating system of the SVM using the first randomization value, the mapped second conversion IP header ID to the second conversion IP header ID to generate a second conversion map that is substantially similar to the conversion map, the second conversion map used to convert IP header ID fields of each network packet of the corresponding second network packets outputted from the SVM.

20. The at least one non-transitory machine readable medium of claim 17, the instructions to cause the system to:
  reorder the intercepted first network packets based on the first conversion IP header ID included in each converted IP header ID field of the respective TCP/IP headers for the intercepted one or more first network packets, the intercepted first network packets reordered such that the first conversion IP header ID are in a sequential order.

21. The at least one non-transitory machine readable medium of claim 16, to convert a TCP window size field comprises the instructions to cause the system to:
  convert each original TCP window size value included in respective TCP window size fields of TCP/IP headers of intercepted first network packets with respective conversion TCP window size values, each conversion TCP window size value increased or decreased to a nearest set TCP window size from among one or more set TCP window sizes.

22. The at least one non-transitory machine readable medium of claim 16, to convert the TCP sequence number field comprises the instructions to cause the system to:
  access the first namespace including first original TCP sequence numbers generated by a first operating system of the PVM executed by the PVM using the first randomization value;
  access the second namespace including first conversion TCP sequence numbers generated using the second randomization value;
  map each first original TCP sequence number from the first namespace to each first conversion TCP sequence number from the second namespace to generate the conversion map;
  identify each first original TCP sequence number included in respective TCP sequence number fields of the respective TCP/IP headers for the intercepted first network packets;
  convert each identified first original TCP sequence number from the first namespace to a first conversion TCP sequence number from the second namespace using the conversion map; and
  insert each of first conversion TCP sequence numbers in the TCP sequence number field of the first network packets.

* * * * *

UNITED STATES PATENT AND TRADEMARK OFFICE
CERTIFICATE OF CORRECTION

| | | |
|---|---|---|
| PATENT NO. | : 11,023,265 B2 | Page 1 of 1 |
| APPLICATION NO. | : 15/552738 | |
| DATED | : June 1, 2021 | |
| INVENTOR(S) | : Yao Zu Dong and Yunhong Jiang | |

It is certified that error appears in the above-identified patent and that said Letters Patent is hereby corrected as shown below:

In the Claims

Column 33, Line 3, in Claim 9, replace "randomization value; and converting" with -- randomization value; converting --.

Column 34, Line 51, in Claim 16, replace "randomization value; and converting" with -- randomization value; converting --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*